United States Patent
Pezent et al.

(10) Patent No.: US 11,366,522 B1
(45) Date of Patent: Jun. 21, 2022

(54) SYSTEMS AND METHODS FOR PROVIDING SUBSTANTIALLY ORTHOGONAL MOVEMENT OF A DEVICE ABOUT A USER'S BODY PART

(71) Applicant: Facebook Technologies, LLC, Menlo Park, CA (US)

(72) Inventors: Evan Matthew Pezent, Redmond, WA (US); Priyanshu Agarwal, Sunnyvale, CA (US); Hrvoje Benko, Seattle, WA (US); Nicholas Colonnese, Kirkland, WA (US); Ali Israr, Bothell, WA (US); Shea Jonathan Robinson, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 39 days.

(21) Appl. No.: 15/930,022

(22) Filed: May 12, 2020

Related U.S. Application Data

(63) Continuation of application No. 16/206,995, filed on Nov. 30, 2018, now Pat. No. 10,678,334.

(51) Int. Cl.
  *G06F 3/01* (2006.01)
  *G08B 6/00* (2006.01)
(52) U.S. Cl.
  CPC .............. *G06F 3/016* (2013.01); *G08B 6/00* (2013.01); *G06F 3/014* (2013.01)
(58) Field of Classification Search
  None
  See application file for complete search history.

(56) References Cited

U.S. PATENT DOCUMENTS

| | | |
|---|---|---|
| 2015/0141784 A1 | 5/2015 | Morun et al. |
| 2015/0331488 A1* | 11/2015 | Grant ..................... G06F 3/016 715/702 |
| 2016/0103489 A1 | 4/2016 | Cruz-Hernandez et al. |
| 2016/0231815 A1* | 8/2016 | Moussette ............... G06F 3/016 |
| 2017/0178471 A1 | 6/2017 | Levesque et al. |
| 2017/0221324 A1* | 8/2017 | Kawaguchi .............. G06F 3/01 |
| 2017/0243451 A1* | 8/2017 | Alghooneh ............ G06F 1/163 |
| 2018/0259915 A1 | 9/2018 | Hosoi et al. |

(Continued)

OTHER PUBLICATIONS

Aggravi et al., "Design and Evaluation of a Wearable Haptic Device for Skin Stretch, Pressure, and Vibrotactile Stimuli", IEEE Robotics and Automation Letters, vol. 3, No. 3, Feb. 2018, pp. 1-8.

(Continued)

*Primary Examiner* — Brent Swarthout
(74) *Attorney, Agent, or Firm* — FisherBroyles, LLP

(57) ABSTRACT

The disclosed wearable apparatus may include (1) a device dimensioned to fit about a body part of a user, (2) a tensioning mechanism that harnesses to the device in a manner that is relative to the fit of the device about the body part of the user, and (3) an actuator couples to the tensioning mechanism that, when actuated, causes substantially tangential movement of the tensioning mechanism relative to a surface of the body part to produce substantially orthogonal movement of the device relative to the surface of the body part. Various other methods, systems, and/or computer-readable media are also disclosed.

15 Claims, 18 Drawing Sheets

(56) References Cited

U.S. PATENT DOCUMENTS

2020/0249762 A1* 8/2020 Keller .................. G06F 3/011

OTHER PUBLICATIONS

Bailenson et al., Virtual Interpersonal Touch: Expressing and Recognizing Emotions Through Haptic Devices, vol. 22, No. 3, 2007, pp. 325-353.

Bark et al., "Comparison of Skin Stretch and Vibrotactile stimulation for Feedback of Proprioceptive Information", IEEE Haptic Symposium on Interfaces for Virtual Environment and Teleoperator Systems, 2008, 8 pages.

Battaglia et al., "The Rice Haptic Rocker: skin stretch haptic feedback with the Pisa/IIT SoftHand", IEEE World Haptics Conference (WHC), 2017, 6 pages.

Baumann et al., "Emulating Human Attention-Getting Practices with Wearable Haptics", IEEE Haptics Symposium, 2010, 8 pages.

Bianchi et al., "Design and Preliminary Affective Characterization of a Novel Fabric-based Tactile Display", URL: https://core.ac.uk/display/54924104, IEEE Haptics Symposium, Feb. 2014, pp. 591-596.

Hatzfeld et al., "Just Noticeable Differences of Low-Intensity Vibrotactile Forces at the Fingertip", International Conference on Human Haptic Sensing and Touch Enabled Computer Applications, Jun. 2012, 6 pages.

Krishna et al., "VibroGlove: An Assistive Technology Aid for Conveying Facial Expressions", CHI'10 Extended Abstracts on Human Factors in Computing Systems, Apr. 12-13, 2010, pp. 3637-3642.

Mahns et al., "Vibrotactile Frequency Discrimination in Human Hairy Skin", Journal of Neurophysiology, vol. 95, No. 3, 2006, pp. 1442-1450.

Meli et al., "The hBracelet: a wearable haptic device for the distributed mechanotactile stimulation of the upper limb", IEEE Robotics and Automation Letters, 2018, pp. 1-8.

Pacchierotti et al., "Wearable Haptic Systems for the Fingertip and the Hand: Taxonomy, Review, and Perspectives", IEEE transactions on Haptics, vol. 10, No. 4, 2017, pp. 580-600.

Pece et al., "MagTics: Flexible and Thin Form Factor Magnetic Actuators for Dynamic and Wearable Haptic Feedback", Proceedings of the 30th Annual ACM Symposium on User Interface Software and Technology, Oct. 22-25, 2017, 12 pages.

Rantala et al., "Touch gestures in communicating emotional intention via vibrotactile stimulation", International Journal of Human-Computer Studies, vol. 71, No. 6, 2013, pp. 1-29.

Salminen et al., "Emotional and Behavioral responses to Haptic stimulation", Proceedings of the SIGCHI Conference on Human Factors in Computing Systems, Apr. 5-10, 2008, pp. 1555-1562.

Tsetserukou et al., "Affective Haptics in Emotional Communication", IEEE International Conference on Affective Computing and Intelligent Interaction and Workshops, Sep. 2009, 6 pages.

Vallbo et al., "Properties of cutaneous mechanoreceptors in the human hand related to touch sensation", Human Neurobiol, vol. 3, No. 1, 1984, pp. 3-14.

Wheeler et al., "Investigation of Rotational Skin Stretch for Proprioceptive Feedback With Application to Myoelectric Systems", IEEE Transactions on Neural Systems and Rehabilitation Engineering, vol. 18, 2010, pp. 1-9.

* cited by examiner

SYSTEMS AND METHODS FOR PROVIDING SUBSTANTIALLY ORTHOGONAL MOVEMENT OF A DEVICE ABOUT A USER'S BODY PART

CROSS REFERENCE TO RELATED APPLICATION

This application is a continuation of U.S. patent application Ser. No. 16/206,995, filed Nov. 30, 2018, now U.S. Pat. No. 10,678,334, the contents of which are incorporated herein by reference in their entirety.

BACKGROUND

Wearable electronic devices, such as watches and artificial reality headsets, are becoming increasingly common. Unfortunately, the some of these devices may cause discomfort as a result of how they fit and/or how they provide haptic feedback.

SUMMARY

As will be described in greater detail below, the instant disclosure describes systems and methods for providing substantially orthogonal movement of a device relative to a surface of a user's body part. In some embodiments, this substantially orthogonal movement may provide a more uniform compression about the user's body part to improve fit of the device and/or to make tactile feedback provided by the device more natural or comfortable. In one embodiment, a wearable apparatus may include (1) a device dimensioned to fit about a body part of a user, (2) a tensioning mechanism that harnesses to the device in a manner that is relative to the fit of the device about the body part of the user, and (3) an actuator that couples to the tensioning mechanism that, when actuated, causes substantially tangential movement of the tensioning mechanism relative to a surface of the body part to produce substantially orthogonal movement of the device relative to the surface of the body part.

The wearable apparatus may further include a guide mechanism that directs the substantially tangential movement of the tensioning mechanism along a substantial center of the device relative to the surface of the body part. The wearable apparatus may also include a housing that (1) retains the actuator (e.g., a direct current motor, a stepper motor, a servo motor, or the like), (2) surrounds the actuator in a manner that reduces noise when the actuator is actuated, and (3) retains the guide mechanism at a substantial center of the device relative to the surface of the body part.

In one embodiment, the wearable apparatus includes a drive unit mounted to the actuator and mechanically coupled to the tensioning mechanism to drive the substantially tangential movement of the tensioning mechanism without backlash. In such an embodiment, the drive unit may include a spool and the tensioning mechanism may include a cable. Thus, the actuator, when actuated, may rotate the cable about the spool to provide the substantially tangential movement of the tensioning mechanism.

In another embodiment, the device is configured as a plurality of band elements with each band element having a guide mechanism about which the tensioning mechanism harnesses to the device. In such an embodiment, each guide mechanism may position the tensioning mechanism away from contact with the surface of the body part.

The wearable apparatus may further include a controller communicatively coupled to the actuator and to a haptic device to provide closed-loop control of the actuator.

In one embodiment, a method includes (1) harnessing a tensioning mechanism to a device dimensioned to fit about a body part of a user, the tensioning mechanism harnessing to the device in a manner that is relative to the fit of the device about the body part of the user, and (2) coupling an actuator to the tensioning mechanism in a manner that, when actuated, causes substantially tangential movement of the tensioning mechanism relative to a surface of the body part to produce substantially orthogonal movement of the device relative to the surface of the body part.

In some embodiments, the method includes configuring the device with a guide mechanism that directs the substantially tangential movement of the tensioning mechanism along a substantial center of the device relative to the surface of the body part. In such an embodiment, the method may include providing a housing to (1) retain the actuator and to (2) surround the actuator in a manner that reduces noise when the actuator is actuated. The housing may also retain the guide mechanism at a substantial center of the device relative to the surface of the body part.

The method may also include (1) mounting a drive unit to the actuator, and (2) mechanically coupling the drive unit to the tensioning mechanism to drive the substantially tangential movement of the tensioning mechanism without backlash. For example, the drive unit may include a spool and the tensioning mechanism may include a cable. The method may, therefore, further include configuring the actuator to rotate the cable about the spool to provide the substantially tangential movement of the tensioning mechanism.

In one example, the method also includes (1) configuring the device with a plurality of band elements, and (2) configuring each band element with a guide mechanism about which the tensioning mechanism harnesses to the device. In such an example, the method may also include configuring each guide mechanism within each band element in a manner that positions the tensioning mechanism away from contact with the surface of the body part. The method may further include communicatively coupling a controller to the actuator and to a haptic device to provide closed-loop control of the actuator.

In another embodiment, a method includes (1) receiving an indication from a processing system to actuate an actuator that is coupled to a tensioning mechanism, the tensioning mechanism being harnessed to a device that is dimensioned to fit about a body part of a user and being harnessed to the device in a manner that is relative to the fit of the device about the body part of the user, and (2) based on the indication, actuating the actuator in a manner that (a) directs movement of the tensioning mechanism in a substantially tangential manner relative to a surface of the body part, and (b) produces substantially orthogonal movement of the device relative to the surface of the body part such that the device contacts the surface of the body part.

In one example, the method may include receiving a control signal from the processing system that changes the manner in which the actuator directs movement of the tensioning mechanism. For example, the method may further include receiving feedback from a haptic apparatus that the processing system uses to generate the control signal.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
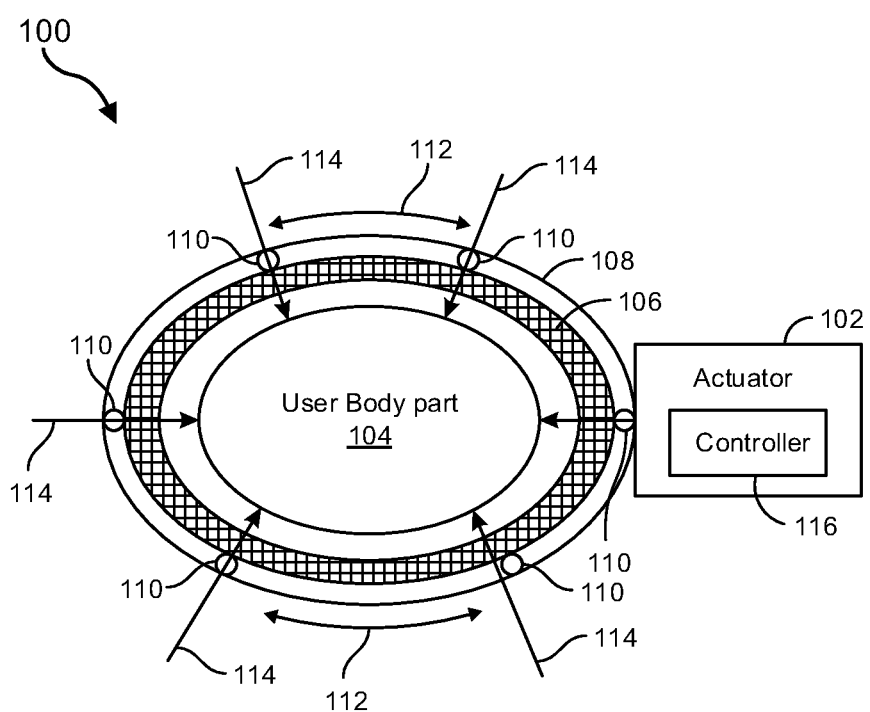
FIG. 1 is a block diagram of an example embodiment of a wearable apparatus fitted about a user's body part.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to providing substantially orthogonal movement of a device relative to a surface of a user's body part, thereby providing generally uniform compression of the user's body part via the device. For example, the device may fit about a body part of a user (e.g., the device may be a wristband). An actuator may actuate a tensioning mechanism, such as a cable, harnessed to the device to pull the device into contact with a surface of the user's body part. In other words, the actuator may pull the tensioning mechanism towards the actuator. As the tensioning mechanism is harnessed to the device, the device may move in a substantially orthogonal manner relative to a surface of the user's body part, thereby compressing the device against the user's body part. The actuator may also loosen the device in a similar but opposite fashion, thereby releasing compression.

Embodiments of the present disclosure may provide a number of features and advantages. For example, some actuation mechanisms discussed herein may limit or reduce a shear force against a user's skin. The systems disclosed herein may also distribute force around a user's body part in a manner that feels more comfortable and/or natural that other systems. Furthermore, some of devices in this disclosure may use reduce unwanted noise and/or vibration triggered by an actuator.

Figure 2:
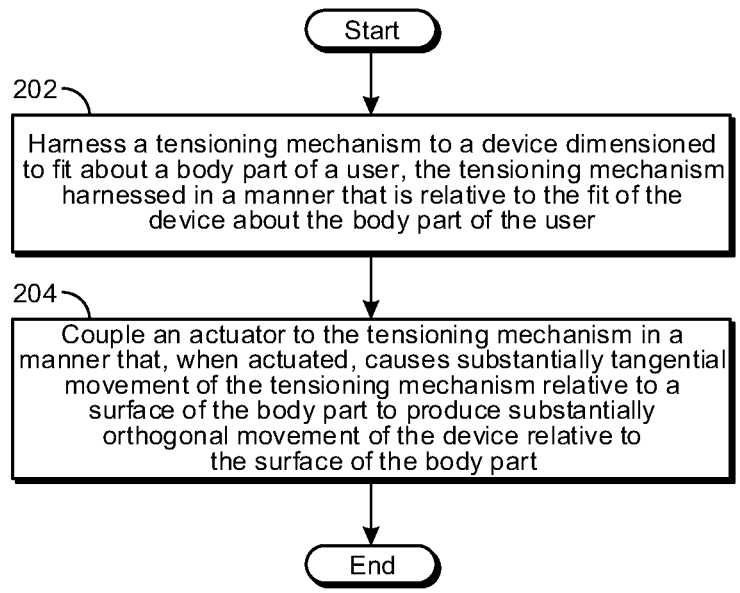
FIGS. 2 and 3 are flow diagrams of example embodiments of methods of the wearable apparatus of FIG. 1.
Figure 3:
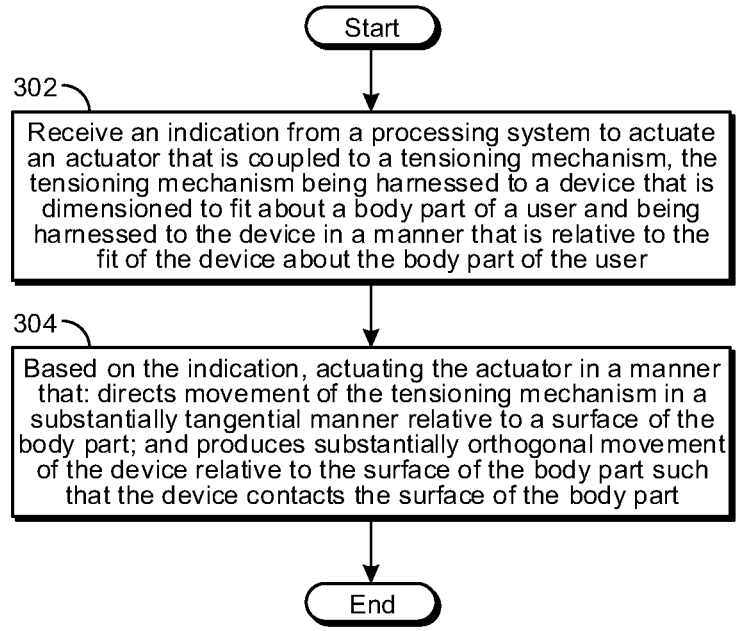
Figure 4:
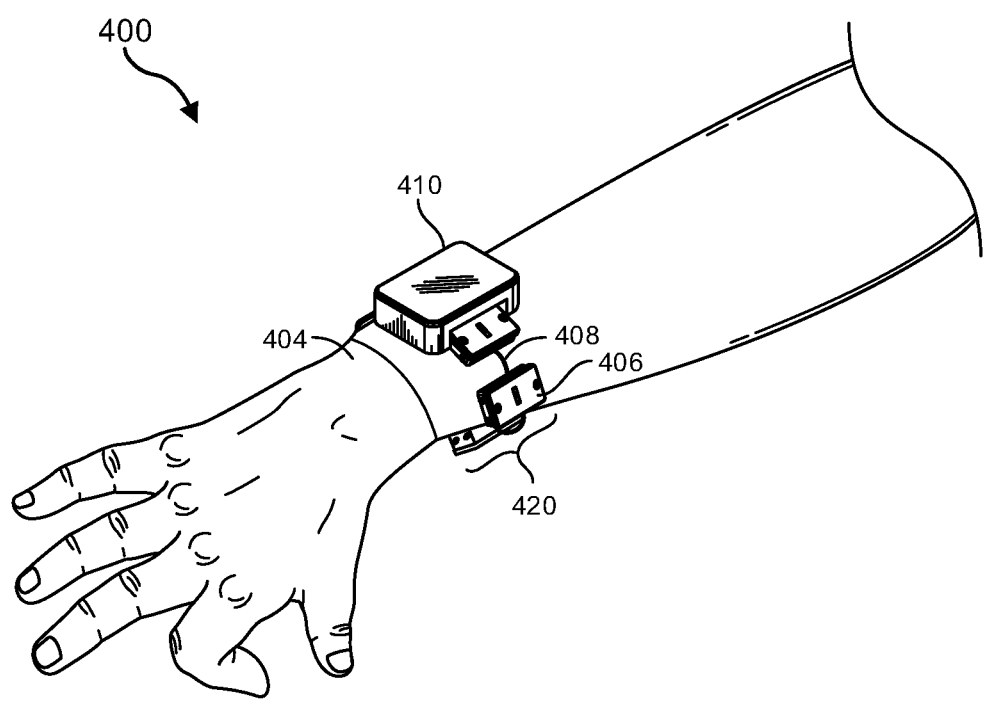
FIG. 4 is a perspective view of an example embodiment of a wearable apparatus fitted about a user's wrist.
Figure 17:
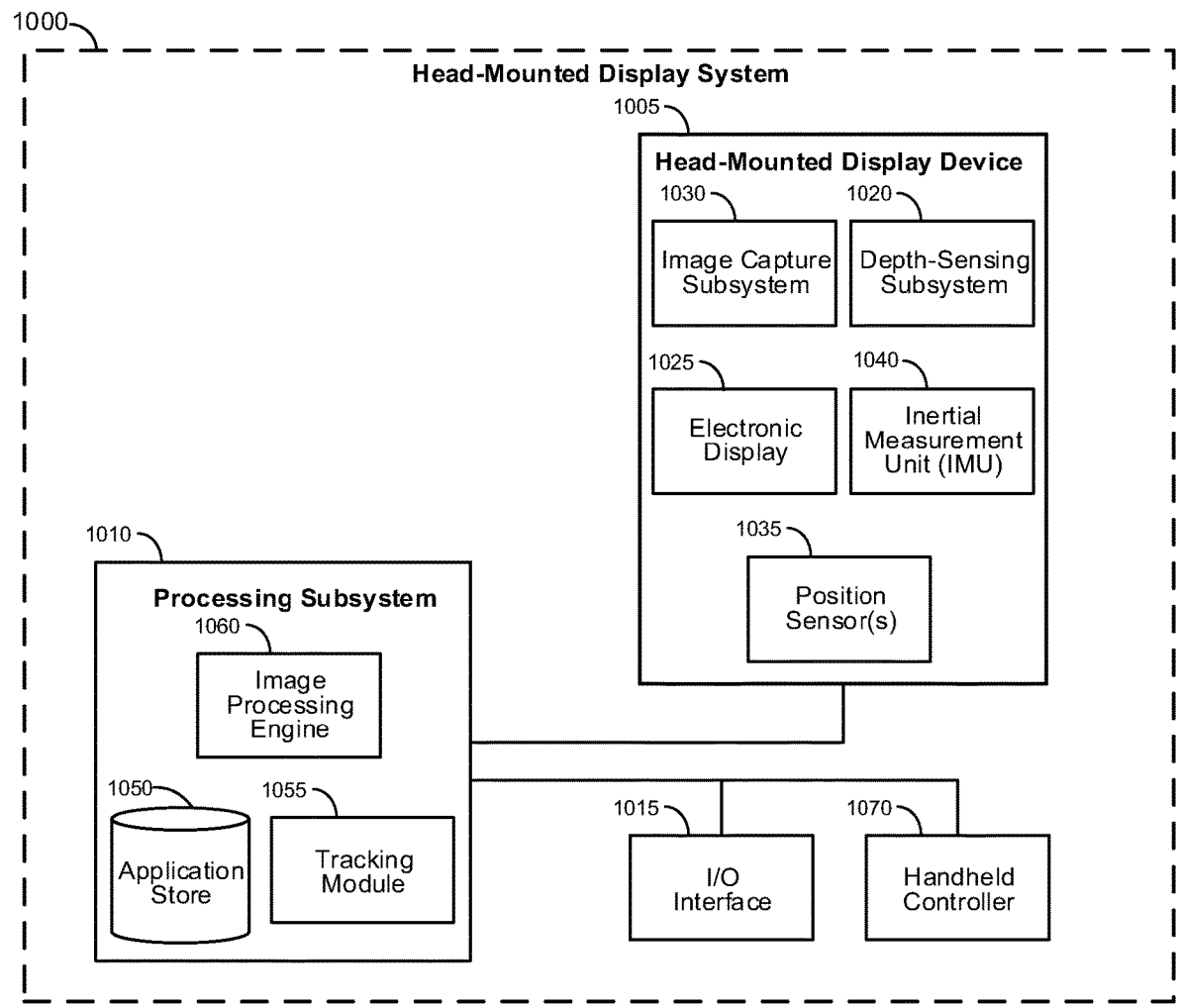
FIG. 17 is a block diagram of an example embodiment of an HMD system.
Figure 18:
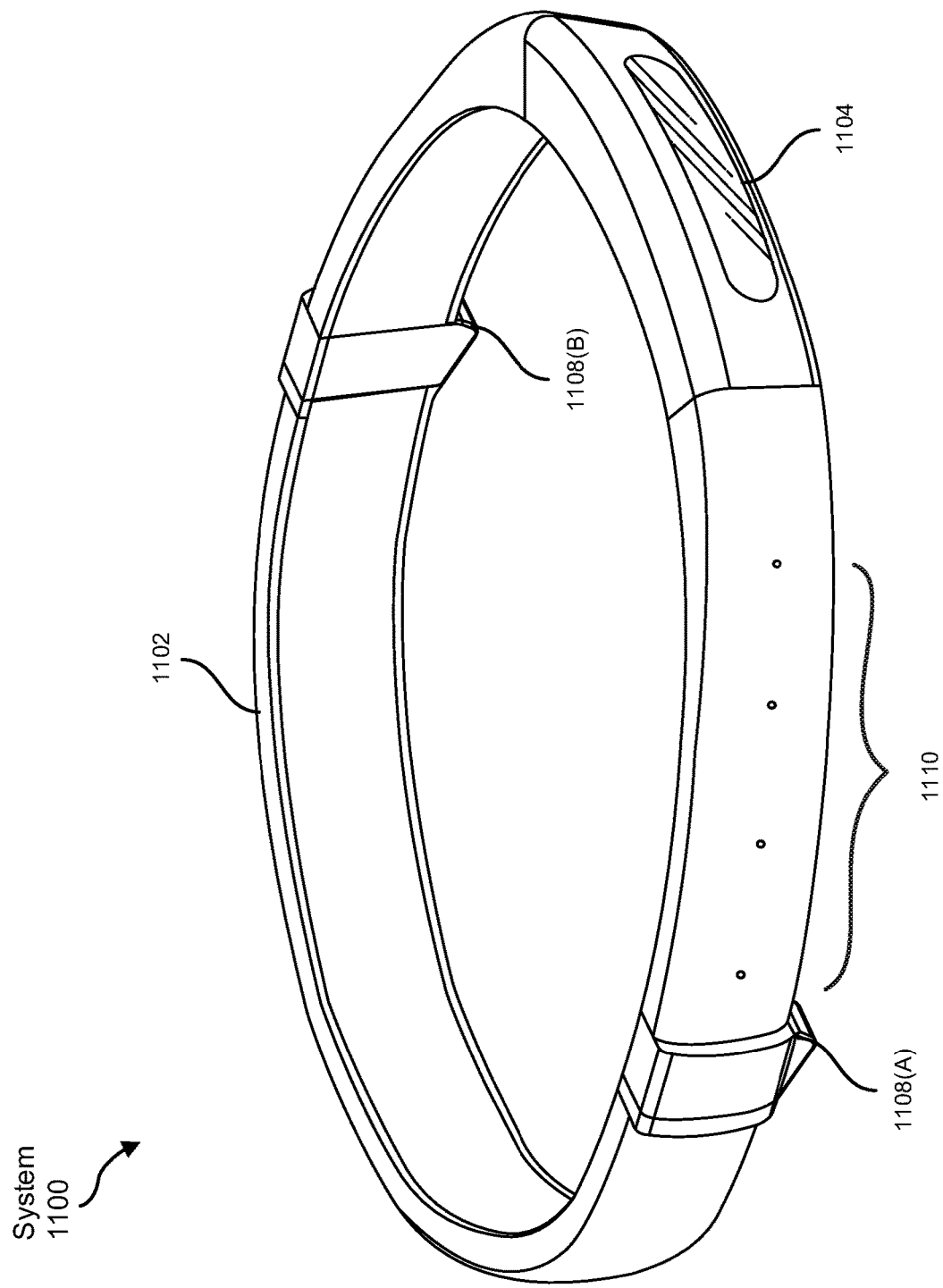
FIG. 18 is a perspective view of an example embodiment of an AR system dimensioned to fit about a body part of a user.
Figure 19:
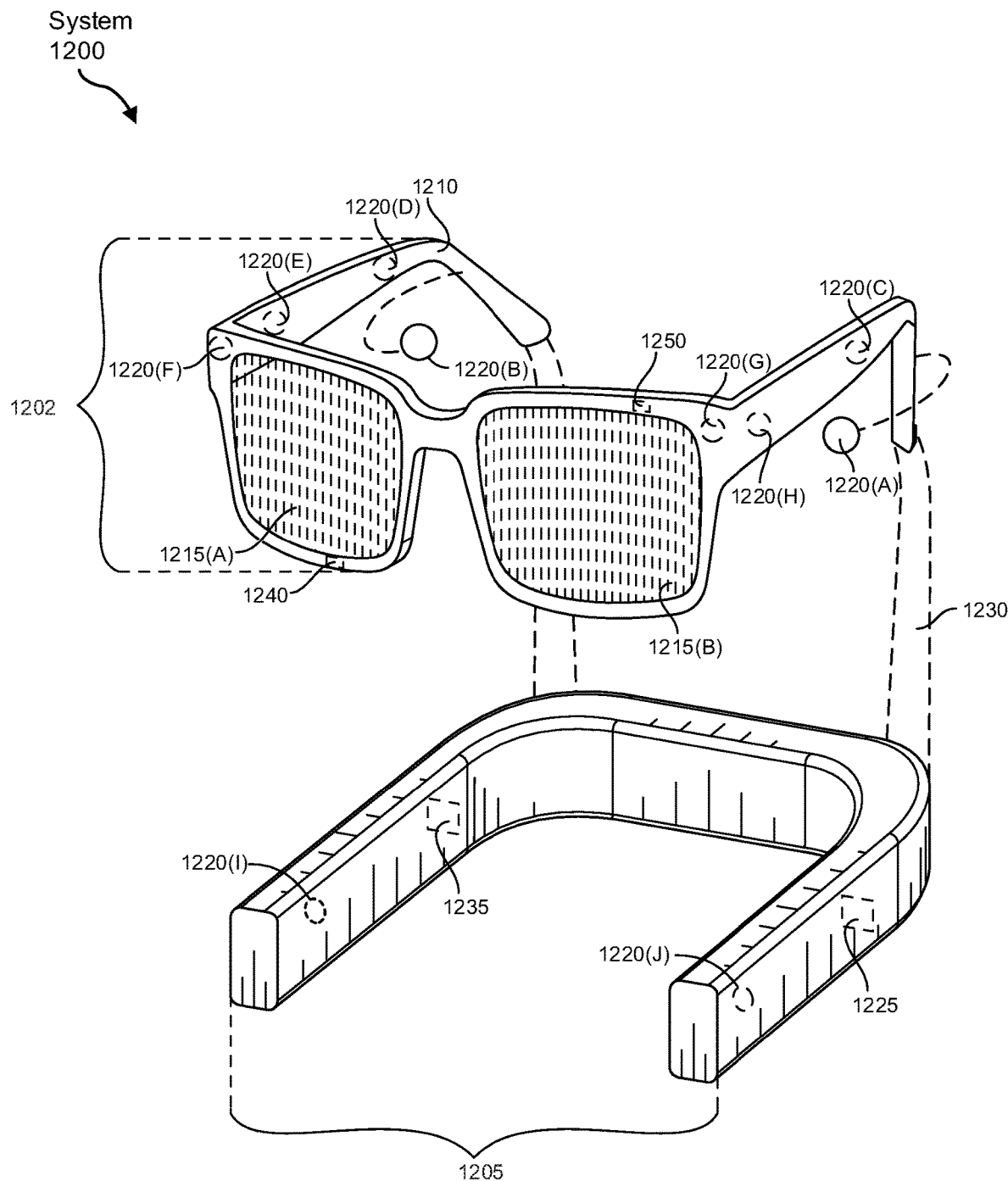
FIG. 19 is a perspective view of an example embodiment of an AR system configured with near-eye displays.
Figure 20:
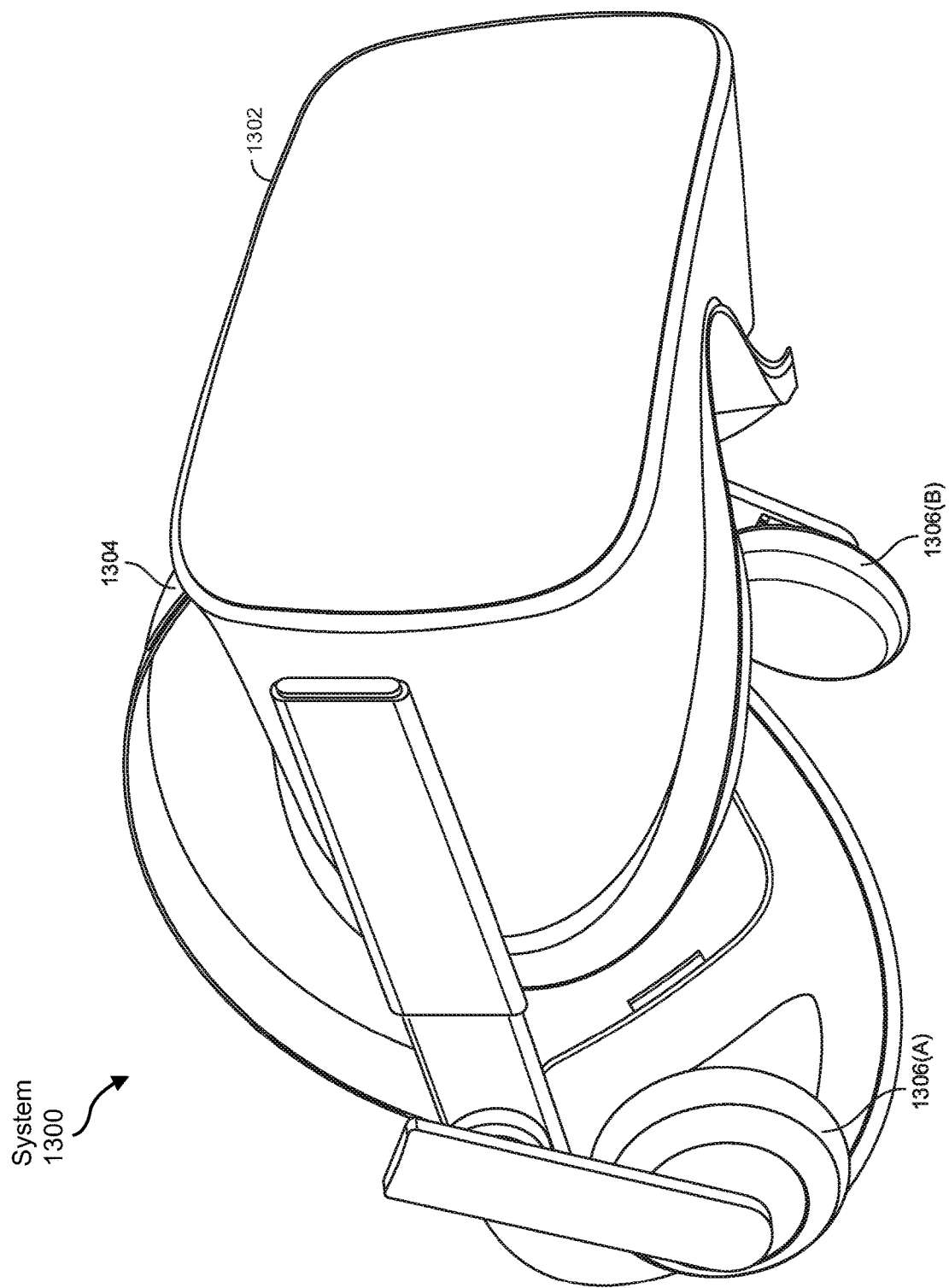
FIG. 20 is a perspective view of an example embodiment of an AR system configured as a head-worn display system.

The following will provide, with reference to FIGS. 1-20, detailed descriptions of systems and methods for providing substantially orthogonal motion of a device relative to a surface of a user's body part. First, a description of an example embodiment of a wearable apparatus is presented in reference to FIG. 1. FIGS. 2-3 illustrate flow diagrams of example embodiments of methods of the wearable apparatus. FIG. 4 illustrates the wearable apparatus fitted about a user's wrist. FIGS. 5-16 illustrate example embodiments of various components and ways for configuring such components. FIG. 17 illustrates an example embodiment of a head mounted display (HMD) system. FIGS. 18-20 illustrate various types of example artificial reality devices that may be used with an HMD system.

Embodiments of the instant disclosure may include or be implemented in conjunction with various types of artificial reality systems, as discussed in greater detail below. For example, an action in an artificial reality environment may control how and when the device compresses and releases. To illustrate, in an embodiment where the device is fitted about a user's wrist, the device may compress about the user's wrist when an actor in an artificial reality environment grabs the wrist of the user immersed in the artificial reality environment. Thus, the user may feel like another person is actually grabbing the user's wrist.

Turning now to FIG. 1 is a block diagram of wearable apparatus 100 that fits about user body part 104 (e.g., like a band about a user's wrist). Wearable apparatus 100 may include any suitable configuration that fits about a user's body part, including for example sleeves that wrap about user body part 104 and belts. User body part 104 may represent any body part of a user including, for example, a leg, an ankle, an arm, a neck, a waist, a chest, etc.

In this example, wearable apparatus 100 includes a device 106 that fits about user body part 104. Device 106 may be configured with a tensioning mechanism 108 to apply substantially orthogonal movement of device 106. For example, tensioning mechanism 108 may harness to device 106 in a manner that is relative to the fit of device 106 about user body part 104. An actuator 102 may be coupled to tensioning mechanism 108 and, when actuated, causes substantially tangential movement 112 of tensioning mechanism 108 relative to a surface of user body part 104. The substantially tangential movement 112 of tensioning mechanism 108 may produce substantially orthogonal movement 114 of device 106 relative to the surface of user body part 104.

The term "substantially orthogonal movement" generally refers to any movement that is partially, mostly, or completely perpendicular to a surface of a user's body part. For example, substantially orthogonal movement may be movement generally in a direction toward a user's body part. Conversely, the term "substantially tangential movement" generally refers to any movement that is partially, mostly, or completely parallel to a surface of a user's body part. For example, substantially tangential movement may be movement generally in a direction along a surface of a user's body part.

In one embodiment, tensioning mechanism 108 may harness to device 106 at a plurality of compression points 110, as indicated by arrows through compression points 110. However, as actuator 102 causes the substantially tangential movement 112 of tensioning mechanism 108 relative to a surface of user body part 104, tensioning mechanism 108 may create a substantially uniform distribution of the substantially orthogonal movement 114 throughout device 106, thereby applying a substantially uniform compression about user body part 104. Similarly, when actuated in an opposite direction, actuator 102 may cause substantially tangential movement 112 of tensioning mechanism 108 in an opposite direction, thereby releasing compression about user body part 104 in a substantially uniform manner.

In one embodiment, actuator 102 includes a controller 116 that receives an indication (e.g., from a processing system) to actuate actuator 102. The indication may direct actuator 102 to provide substantially tangential movement 112 of tensioning mechanism 108 and thus produce substantially orthogonal movement 114 of device 106. For example, in a closed-loop control configuration, a processing system may receive feedback from a haptic apparatus. The processing system may use the feedback to generate a control signal that directs actuator 102 to actuate and tangentially move tensioning mechanism 108 relative to a surface of the body part. Examples of such a processing system include computers, head mounted display (HMD) systems such as HMD system 1000 of FIG. 17 shown and described in greater detail below, and the like. However, wearable apparatus 100 may compress against and release from user body part 104 in any of a variety of environments in response to any suitable control signal.

Those skilled in the art should readily recognize that wearable apparatus 100 may include different configurations and/or design choices (e.g., multiple actuators 102, tensioning mechanisms 108, controllers 116, etc.) to produce substantially orthogonal movement 114 of device 106 generally in the direction toward a user's body part. Some non-limiting examples of such configurations and/or design choices are shown and described below. Furthermore, actuator 102 may include any suitable type or form of actuation mechanism, including an electric motor, a piezoelectric actuator (e.g., a bimorph actuator), a fluidic actuator, a hydraulic actuator, etc. In addition, embodiments of the present disclosure may be implemented with any suitable type or form of tensioning mechanism, including a lead screw system, a power screw and nut sled, a cam and roller, a pivoting arm, a rack and pinion, a cable or belt drive, etc.

FIG. 2 is a flow diagram of an example embodiment of a method 200 for providing a wearable apparatus that supports the substantially orthogonal movement of a device as described above. As depicted in FIG. 2, method 200 may include a series of enumerated operations or steps. Embodiments of method 200 may include additional operations before, after, in between, or as part of the enumerated operations. Some embodiments of method 200 may be performed by processing subsystem in connection with other components, such as those of an HMD system. Additionally, some embodiments of method 200 may include a set of instructions, stored on a computer-readable storage medium, that when executed by a processing device, cause the processing device to perform some or all of the operations included in embodiments of method 200. In some embodiments, the operations may be performed in a sequence that is different than the sequence depicted in FIG. 2.

Accordingly, some embodiments of method 200 may begin at step 202 in which wearable apparatus 100 is configured. In this embodiment, a tensioning mechanism (e.g., tensioning mechanism 108 of FIG. 1) harnesses to a device (e.g., device 106 of FIG. 1) at step 202. Tensioning mechanism may be implemented in a variety of ways. Some examples include cables, wires, fiber cords, and any other configuration suitable for being drawn tangentially relative to a surface of a user's body part. The device is dimensioned to fit about a body part of a user (e.g., user body part 104 of FIG. 1). The device may be configured in a variety of ways including single piece belts, incremental belt components linked together, straps. Some examples are shown and described below.

The tensioning mechanism may be harnessed in a manner that is relative to the fit of the device about the body part of the user. An actuator (e.g., actuator 102 of FIG. 1) may couple to the tensioning mechanism in a manner that, when actuated, causes substantially tangential movement of the tensioning mechanism relative to a surface of the body part at step 204. The substantially tangential movement produces substantially orthogonal movement of the device relative to the surface of the body part. An example of an actuating process is shown and described in FIG. 3.

FIG. 3 is a flow diagram of an example embodiment of a method 300 of an operation of actuating a wearable apparatus in response to an indication received from a processing system. For example, a wearable apparatus, such as wearable apparatus 100 shown and described in FIG. 1, may be configured with a controller, such as controller 116 of FIG. 1. The controller may be implemented in a variety of ways including, for example, microprocessors, microcontrollers, and the like. The controller may be communicatively coupled to the processing system (e.g., in an artificial reality environment). The wearable apparatus may receive an indication from the processing system to actuate an actuator (e.g., actuator 102 of FIG. 1) of the wearable apparatus at step 302. As explained above, the actuator may be coupled to a tensioning mechanism (e.g., tensioning mechanism 108 of FIG. 1) that is harnessed to a device (e.g., device 106 of FIG. 1). The device is dimensioned to fit about a body part of the user and the tensioning mechanism harnesses to the device in a manner that is relative to the fit of the device about the body part of the user.

Based on the indication, the actuator may actuate in a manner that directs movement of the tensioning mechanism in a substantially tangential manner relative to a surface of the body part at step 304. This produces substantially orthogonal movement of the device relative to the surface of the body part such that the device contacts the surface of the body part. For example, the tensioning mechanism may cause the device to compress about the user's body part in a substantially uniform manner. Again, actuating the actuator in an opposite manner may cause the device to release compression about the user body part.

To illustrate, in a wristband embodiment in an artificial reality environment, the device may slide onto a user's wrist. The tensioning mechanism may harness to the device (e.g., about a center the device) in a manner that is similar to how the device wraps about the user's wrist. In response to an action in the artificial reality environment, the processing system implementing the artificial reality environment may direct the actuator to actuate and pull the tensioning mechanism along a perimeter of the device relative to the user's wrist causing a substantially tangential movement of the tensioning mechanism relative to the user's wrist. This tangential movement of the tensioning mechanism causes a corresponding substantially orthogonal movement of the device about the user's wrist. The substantially orthogonal movement of the device thereby provides a substantially uniform compression about the user's wrist. When actuated in an opposite direction (e.g. in response to another action in an artificial reality environment), the actuator loosens the tensioning mechanism such that the compression about the user's wrist releases.

FIG. 4 is a perspective view of an example embodiment of a wearable apparatus 400. In this embodiment, wearable apparatus 400 may include device 420 that is dimensioned to fit about user's wrist 404 (e.g., like a band). Device 420 may include a plurality of band elements 406 and a tensioning mechanism 408 that connects band elements 406 to one another, shown and described in greater detail below. Band elements 406 may be configured in a variety of ways including, for example, a single band that harnesses tensioning mechanism 408 at a plurality of points (e.g., band elements) on the band. Some examples of band elements 406 are shown and described in greater detail below.

One or more of band elements 406 may include any type or form of actuator suitable for providing haptic feedback. For example, one or more of band elements 406 may be configured to provide one or more of various types of cutaneous feedback, including vibration, force, traction, texture, and/or temperature. To provide such feedback, band elements 406 may include one or more of various types of actuators, including motors, piezoelectric actuators, fluidic systems, etc. In one example, each of band elements 406 may include a vibrotactor (e.g., a vibrotactile actuator) configured to vibrate in unison or independently to provide one or more of various types of haptic sensations to a user. Alternatively, only a single band element or a subset of band elements may include vibrotactors.

In addition to or instead of haptic actuators, one or more of band elements 406 may also include one or more sensors. For example, one or more of band elements 406 may include an optical sensor, an inertial measurement unit (IMU), an acoustic sensor, and/or any other type or form of sensor. Such sensors may be used for calibration (e.g., determining whether to tighten or loosen band elements 406), motion detection, biometric detection, etc.

Wearable apparatus 400 may include a housing 410 that houses an actuator, such as actuator 102 of FIG. 1. In this embodiment, tensioning mechanism 408 is configured as a cable that is strung through each of band elements 406. For example, tensioning mechanism 408 may enter through a side of one band element 406, be strung over a guide mechanism substantially in the center of band element 406 and exit through an opposite side of band element 406. Tensioning mechanism 408 strings through a center of each of band elements 406 thereby connecting band elements 406 to one another. At least one end of tensioning mechanism 408 enters housing 410 and mechanically couples to an actuator, such as actuator 102 of FIG. 1, residing therein. The other end of tensioning mechanism 408 may fasten to housing 410 or mechanically couple to the actuator.

When actuated, the actuator pulls tensioning mechanism 408 to contract a length of tensioning mechanism 408 and provide substantially tangential movement of tensioning mechanism 408 relative to the surface of user's wrist 404. This substantially tangential movement causes band elements 406 to move in a substantially orthogonal manner relative to the surface of user's wrist 404, thereby producing a substantially even distribution of compression about user's wrist 404. Additionally, as tensioning mechanism 408 is configured at or near the center of each of band elements 406, the substantially orthogonal movement of each of band elements 406 is substantially uniform. For example, as tensioning mechanism 408 contracts, one band element 406 compresses against user's wrist 404 like any other band element 406 of device 420. And, as the tangential movement of tensioning mechanism 408 is through the center of each band element 406, device 420 provides substantially orthogonal motion of each band element 406 relatively devoid of any shearing forces. This orthogonal movement may be used to provide haptic feedback and/or to ensure proper fit of a wearable device.

The squeezing or tightening provided by tensioning mechanism 408 may ensure proper fit in a variety of ways. For example, tensioning mechanism 408 may cause device 420 to decrease in diameter to better fit a user's wrist or other body part. As another example, tensioning mechanism 408 may cause one or more vibrotactors in each band element 406 to have adequate contact with a user's skin for providing haptic feedback to the user. Furthermore, by applying substantially uniform force to each band element 406, tensioning mechanism 408 may ensure that a user perceives haptic feedback from different vibrotactors in different band elements 406 as being substantially equal. In this manner, embodiments of the instant disclosure may facilitate adequate grounding between a vibrotactor in each band element 406 and a user's skin.

It should be noted that the embodiment illustrated in FIG. 4 is but one example. Certain embodiments may be configured with a single band element 406 instead of multiple band elements 406. Other embodiments may also be asymmetric in some regards. For example, some embodiments may have a tensioning mechanism that does not run along a center of band elements 406. In such embodiments, tensioning mechanism 408 may be slightly off-center relative to band elements 406, may be positioned at either side of band elements 406, may include multiple wires, etc. Thus, the guide mechanisms within band elements 406 may also be off-centered. Various other alternative implements also fall within the scope of this disclosure.

Figure 5:
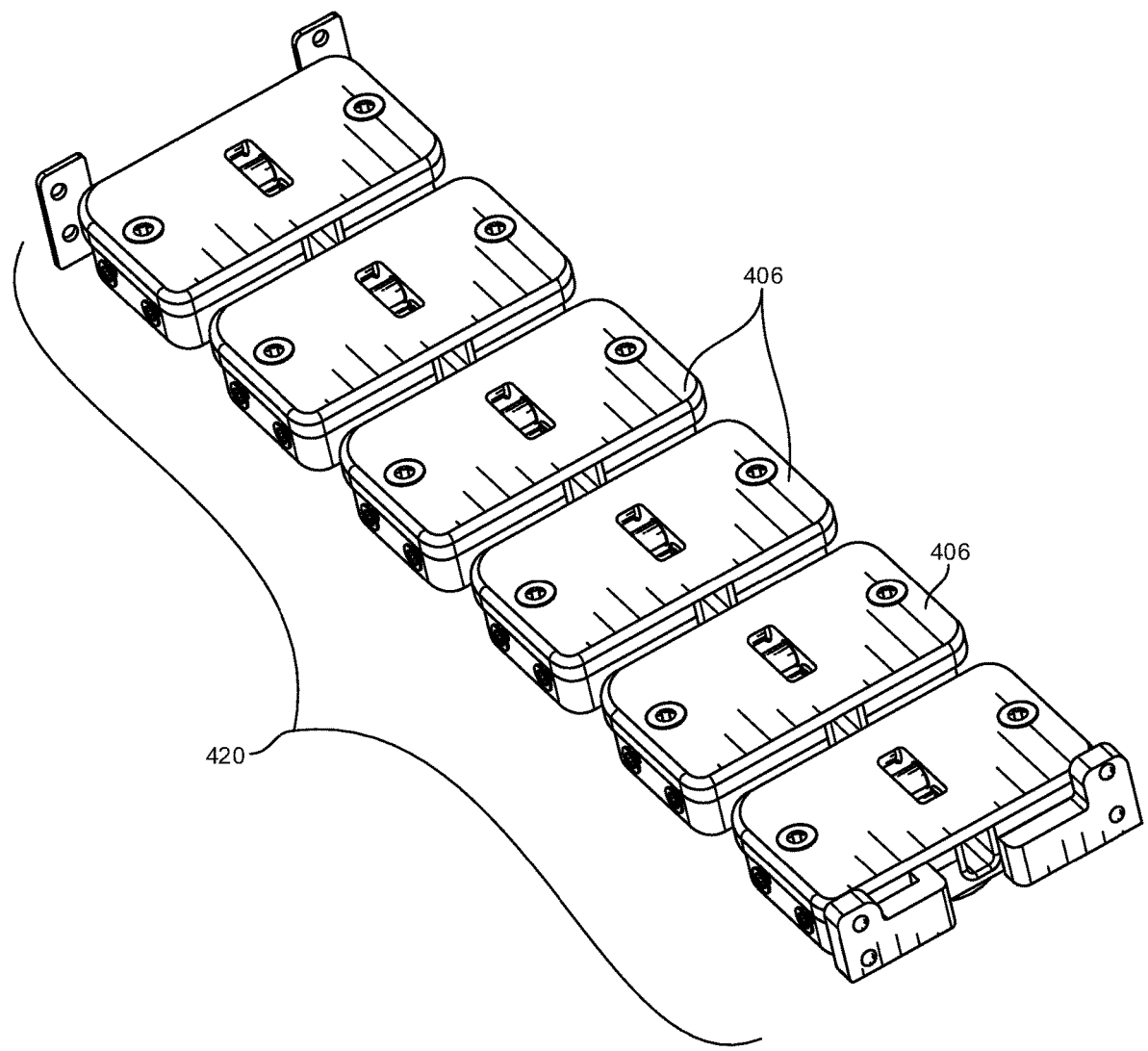
FIG. 5 is a perspective view of an example embodiment of a device configured with the wearable apparatus of FIG. 4 dimensioned to fit about the user's wrist.

FIG. 5 is a perspective view of example embodiment of a device 420 configured with wearable apparatus 400 of FIG. 4. In this embodiment, device 420 may include one or more band element coupling components (shown and described in greater detail below) that mount to each band element 406 along a length of device 420 (e.g., relative to a perimeter of user's wrist 404. The band element coupling component also comprises a mounting component (also shown and described in greater detail below) for coupling to housing 410 of FIG. 4.

It should be noted that the number of band elements 406 may be configured in a variety of ways as a matter of design choice. For example, device 420 may include fewer and/or larger band elements 406 or may include more and/or smaller band elements 406. Band elements 406 may also be configured to have different sizes. However, similar size band elements 406 may provide more even distribution of orthogonal movement of band elements 406 relative to the surface of user's wrist 404. And, similar size band elements 406 may provide certain manufacturing advantages as component sizes can be manufactured according to one particular form factor and/or design.

Additionally, the number and/or size of band elements 406 may be configured in accordance with the size of the user's body part. For example, in a belt configuration dimensioned to fit about a user's waist, device 420 may include many more band elements 406 than illustrated herein. And, in such a configuration, band elements 406 may be considerably larger.

Figure 6:
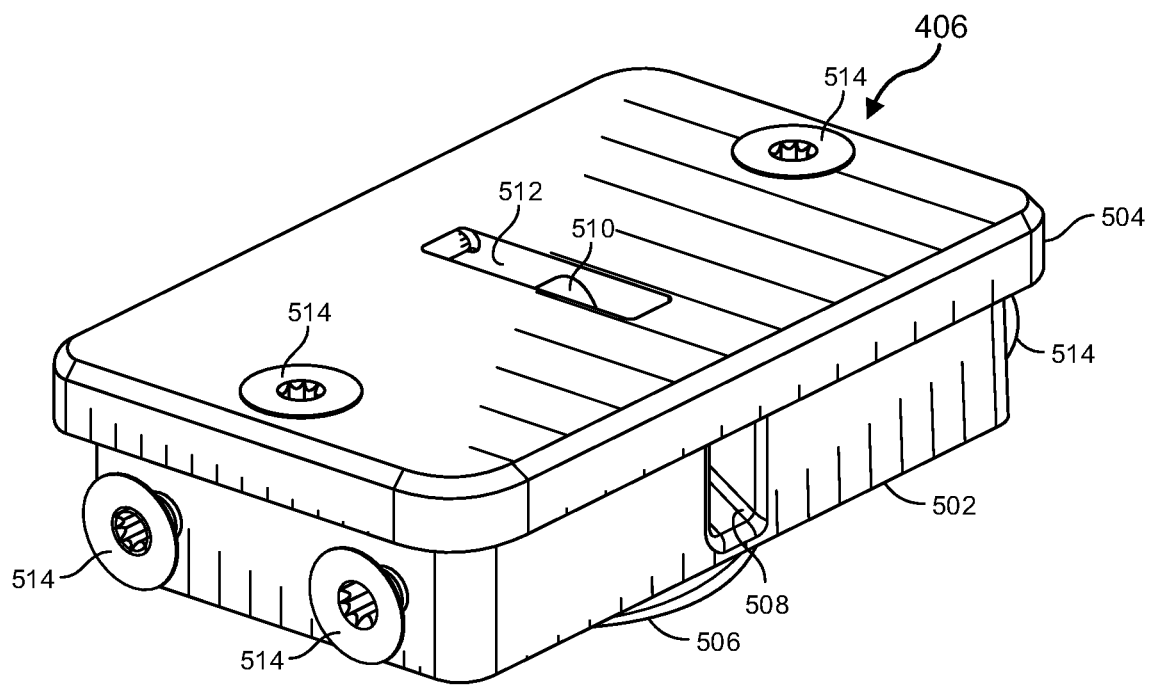
FIG. 6 is a perspective view of an example embodiment of a band element configured with the wearable apparatus of FIG. 1.

FIG. 6 is a perspective view of an individual fully constructed band element 406 configured with the wearable apparatus 400 of FIG. 4. In this embodiment, band element 406 includes lower module 502 and upper module 504. Lower module 502 includes exit/entrance slots 508 on each lengthwise side through which tensioning mechanism 408 of FIG. 4 is strung. Upper module 504 includes exit/entrance slot 512 through which tensioning mechanism 408 is also strung. For example, tensioning mechanism 408 may be strung through exit/entrance slot 508 of the lower module 502 and over guide mechanism 510 (e.g., a pin or a dowel) exposed at exit/entrance slot 512 of upper module 504. Tensioning mechanism 408 may then be strung through exit/entrance slot 512 of upper module 504 and through another exit/entrance slot 508 on the opposite lengthwise side of band element 406, thereby harnessing to band element 406 and thus device 420. In one embodiment, guide mechanism 510 may position tensioning mechanism 408 away from contact with the surface of user's wrist 404 to prevent friction between the body part and tensioning mechanism 408 when tensioning mechanism is actuated. For example, when configured with band element 406, band element 406 may suspend guide mechanism 510 (e.g., to which tensioning mechanism 408 harnesses) above the surface of user's wrist 404, thereby suspending tensioning mechanism 408 above the surface of user's wrist 404.

Upper module 504 of band element 406 may also include one or more fasteners 514 (e.g., screws, bolts, or the like) that are used to secure upper module 504 to lower module 502. However, fastening upper module 504 to lower module 502 may be implemented in a variety of ways as a matter of design choice. For example, glue may be used to permanently secure upper module 504 to lower module 502.

Lower module 502 of band element 406 may also include one or more fasteners 514 (e.g., screws, bolts, or the like) that may be used to couple band element 406 to the aforementioned band element coupling component (again, shown and described in greater detail below). However, fastening lower module 502 to the band element coupling component may be performed in a variety of ways as a matter of design choice (e.g., glue, sewing, etc.)

Lower module 502 of band element 406 may also include compression surface 506. For example, a pad (e.g., foam rubber, cloth, molded plastic, or the like) may be configured with or on lower module 502 to evenly distribute compression resulting from the substantially orthogonal movement of the band element 406 relative to the surface of the user's body part and/or to provide comfort to the user when band element 406 compresses against the surface of the user's body part.

It should be noted that band element 406 may be configured in other ways while still providing substantially orthogonal movement when an actuator, such as actuator 102 of FIG. 1, provides substantially tangential movement of tensioning mechanism 408 relative to a surface of the user's body part. For example, upper module 504 may be configured as a solid unit (e.g., without exit/entrance slot 512). Tensioning mechanism 408 may still be strung through exit/entrance slot 508 of lower module 502 and over guide mechanism 510. In such an embodiment, tensioning mechanism 408 would be enclosed within band element 406. However, configuring upper module 504 with exit/entrance slot 512 may provide certain manufacturing advantages. For example, stringing tensioning mechanism 408 through exit/entrance slots 508 may prove easier with a fully constructed band element 406 when upper module 504 includes exit/entrance slot 508.

Figure 7:
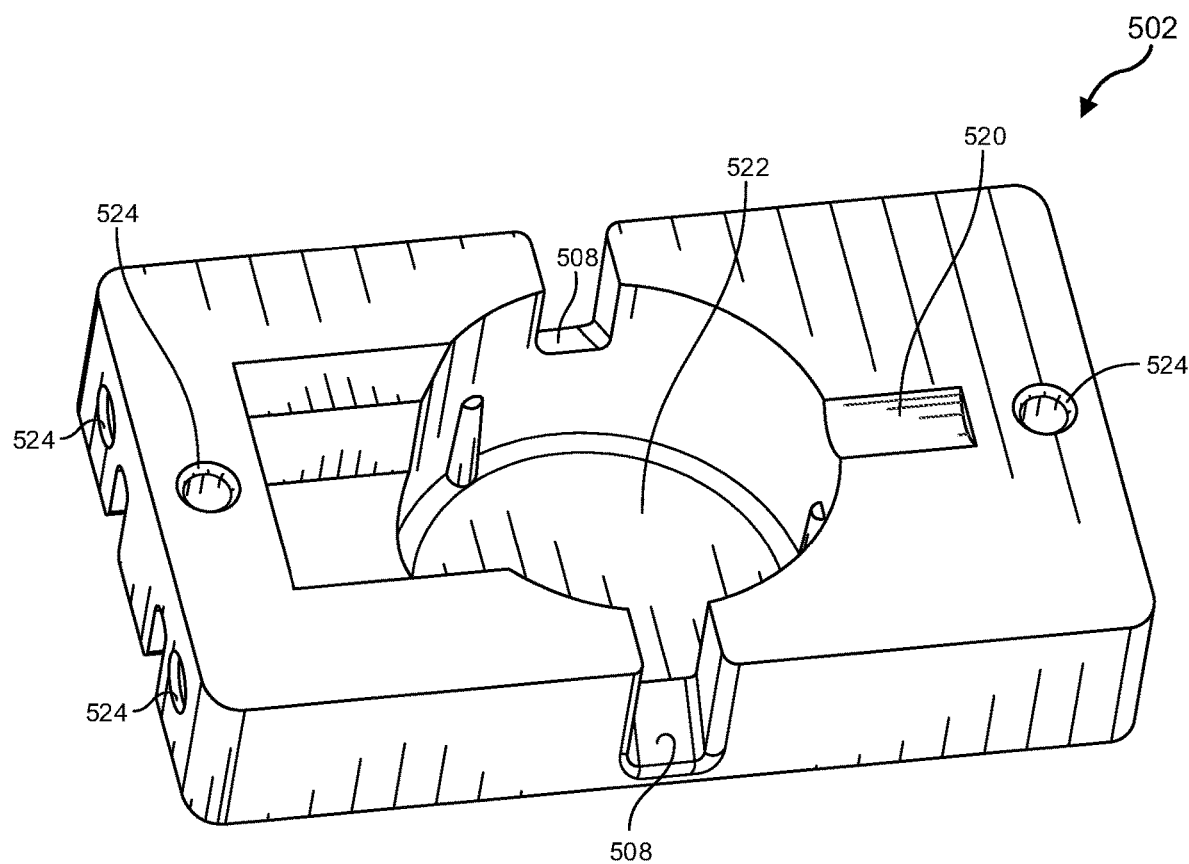
FIG. 7 is a perspective view of an example embodiment of a lower module of the band element of FIG. 6.
Figure 8:
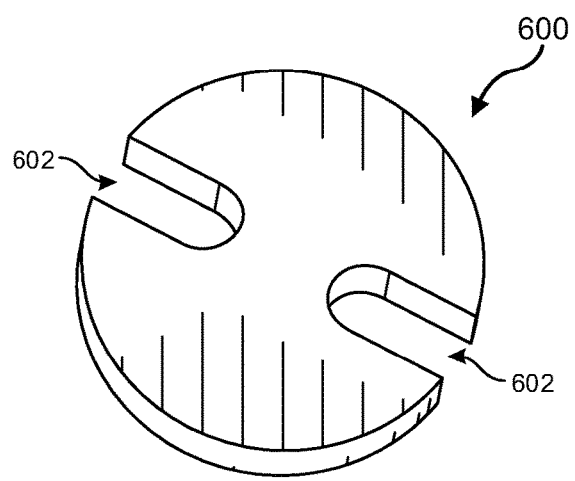
FIG. 8 is a perspective view of an example embodiment of a shock component that resides in the lower module of FIG. 7.

FIG. 7 is a perspective view of an example embodiment of a lower module 502 of the band element 406 of FIG. 6. In this embodiment, lower module 502 is configured with shock port 522 in which a shock component, such as shock component 600 of FIG. 8 rests. For example, shock component 600 may be configured as a pad (e.g., foam rubber or the like) and seated within shock port 522 of lower module 502. Ports 602 of shock component 600 may align with exit/entrance slots 508 of lower module 502 to allow passage of tensioning mechanism 408 through band element 406. Lower module 502 may also be configured with guide mechanism channel 520 in which a guide mechanism (e.g., a pin or dowel) seats while sitting atop shock component 600. The guide mechanism channel 520 stabilizes the guide mechanism with shock component 600 and shock component 600 provides shock absorption to the guide mechanism when tensioning mechanism 408 is actuated.

This embodiment also shows lower module 502 configured with fastening ports 524 to fasten band element 406 to the band element coupling component as well as to upper module 504. However, as mentioned, fastening the components herein may be performed in a variety of ways as a matter of design choice.

Figure 9:
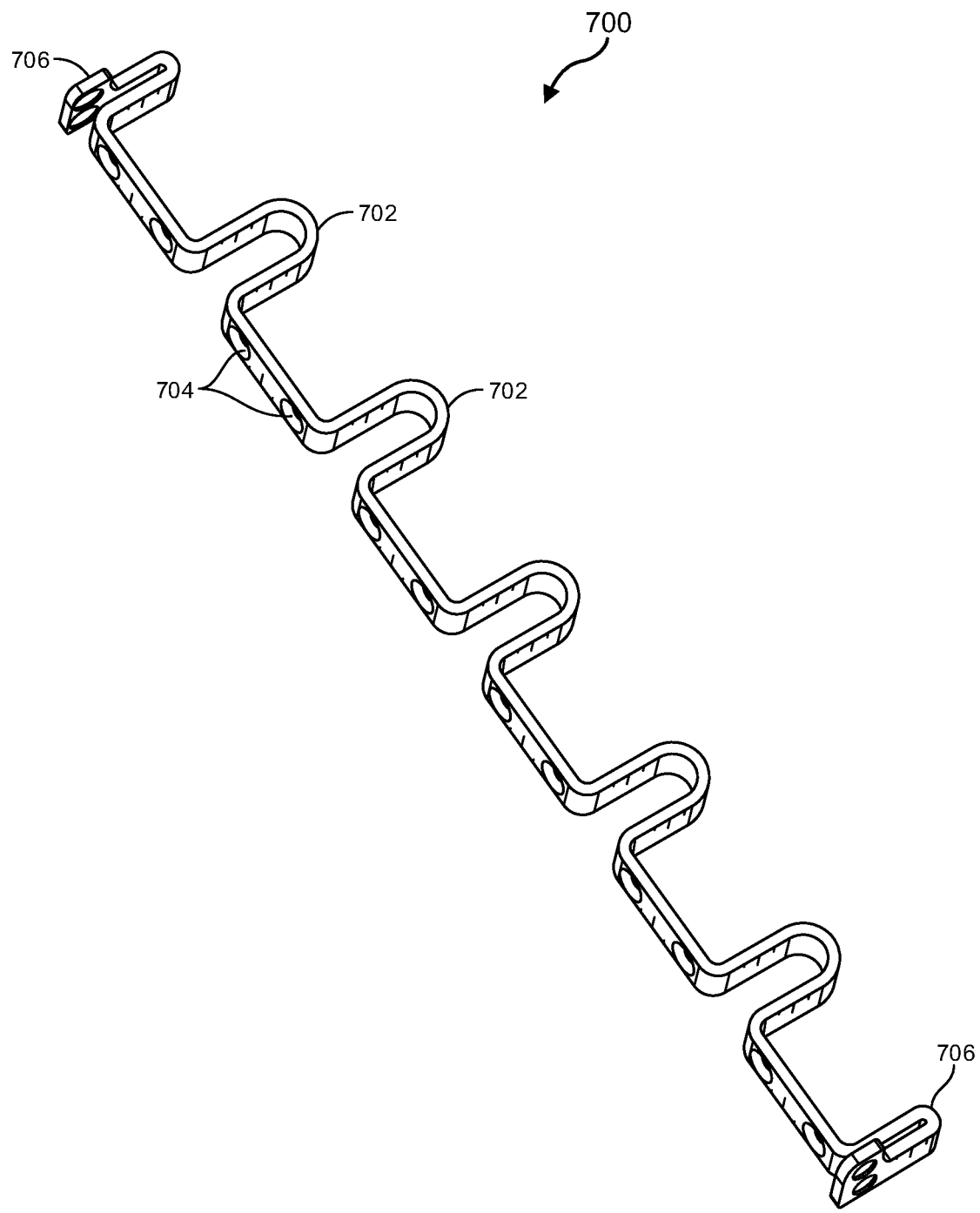
FIG. 9 is a perspective view of an example embodiment of a band element coupling component.

FIG. 9 is a perspective view of an example embodiment of a band element coupling component 700. Band element coupling component 700 may be configured from a flexible material (e.g., rubber, flexible plastic, or the like) to allow device 420 of FIG. 5 to bend about user's wrist 404. Band element coupling component 700 may include fastening components 704 which allow fasteners 514 to fasten band element coupling component 700 to individual band elements 406. Curvatures 702 of band element coupling component 700 provide separation between band elements 406 when fastened to band element coupling component 700. This separation may provide more flexibility in the overall wearable apparatus 400 as band elements 406 are less likely to align with one another when they are drawn towards one another. Band element coupling component 700 may also include mounting components 706 which allow band element coupling component 700 to fasten to housing 410 of FIG. 4.

Figure 10:
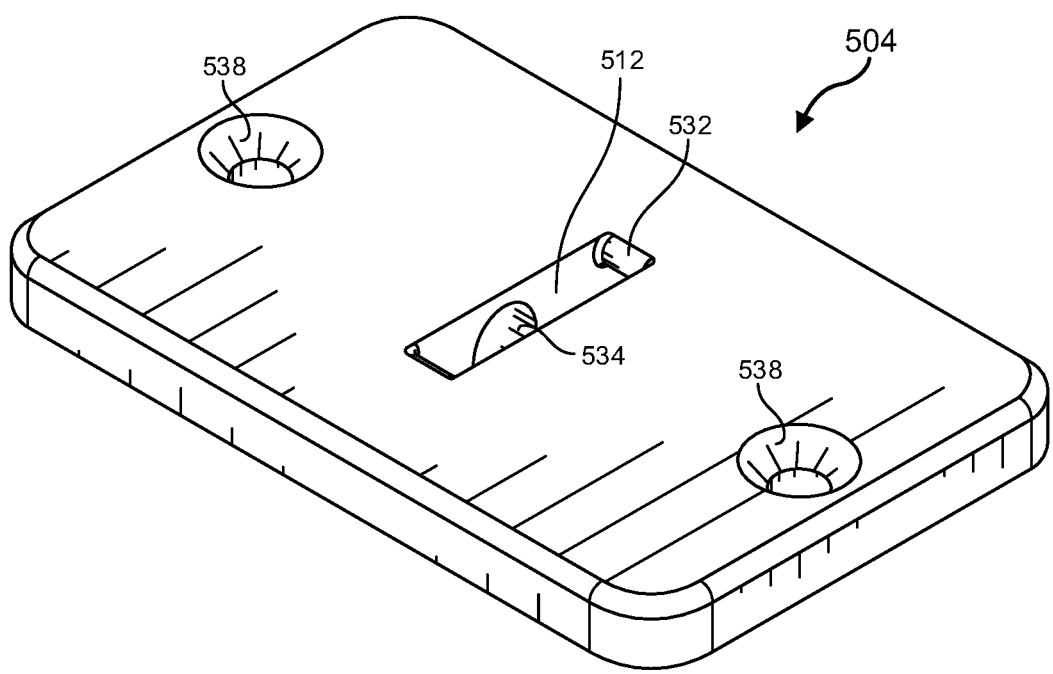
FIG. 10 is a perspective view of an example embodiment of an upper module of the band element of FIG. 6.

FIG. 10 is a perspective view of upper module 504 of band element 406 of FIG. 6. Upper module 504, as described above, includes exit/entrance slot 512 through which tensioning mechanism 408 may be strung. As with lower module 502, upper module 504 may be configured with a guide mechanism channel (i.e., guide mechanism channel 534) that is aligned with guide mechanism channel 520 of lower module 502. Thus, when upper module 504 is fastened to lower module 502, the guide mechanism is secured within band element 406.

Also shown in this embodiment is guide mechanism 532. Guide mechanism 532 may be configured as a pin or a dowel secured within upper module 504 at distal ends of exit/entrance slot 512. Alternatively, guide mechanism 532 may be configured as part of upper module 504. For example, upper module 504 may be molded in such a way as to create guide mechanism 532 as part of upper module 504. In whatever design, when configured at distal ends of exit/entrance slot 512, guide mechanisms 532 may assist in tensioning and guiding tensioning mechanism 408 over the guide mechanism secured in guide mechanism channel 534. For example, tensioning mechanism 408 may be strung through exit/entrance slots 508 of lower module 502. Tensioning mechanism 408 may pass under a first guide mechanism 532 at one end of exit/entrance slot 512 of upper module 504 and over the guide mechanism secured in guide mechanism channel 534. Tensioning mechanism 408 may then pass under guide mechanism 532 at the other end of exit/entrance slot 512 and exit band element 406 on the opposite side of exit/entrance slot 508 of lower module 502. When actuated, tensioning mechanism 408 may press down against the guide mechanism secured at guide mechanism channel 534 relative to the surface of the user's body part and up against guide mechanisms 532 in upper module 504. In this manner, upper module 504 may provide steady and constant tensioning of tensioning mechanism 408 such that tensioning mechanism 408 pushes band element 406 in a substantially orthogonal manner relative to a surface of the user's body part.

Also shown in this embodiment of upper module 504 of band element 406 are fastening ports 538 which secure upper module 504 to lower module 502 of band element 406. Again, fastening upper module 504 to lower module 502 may be performed in a variety of ways as a matter of design choice.

Figure 11:
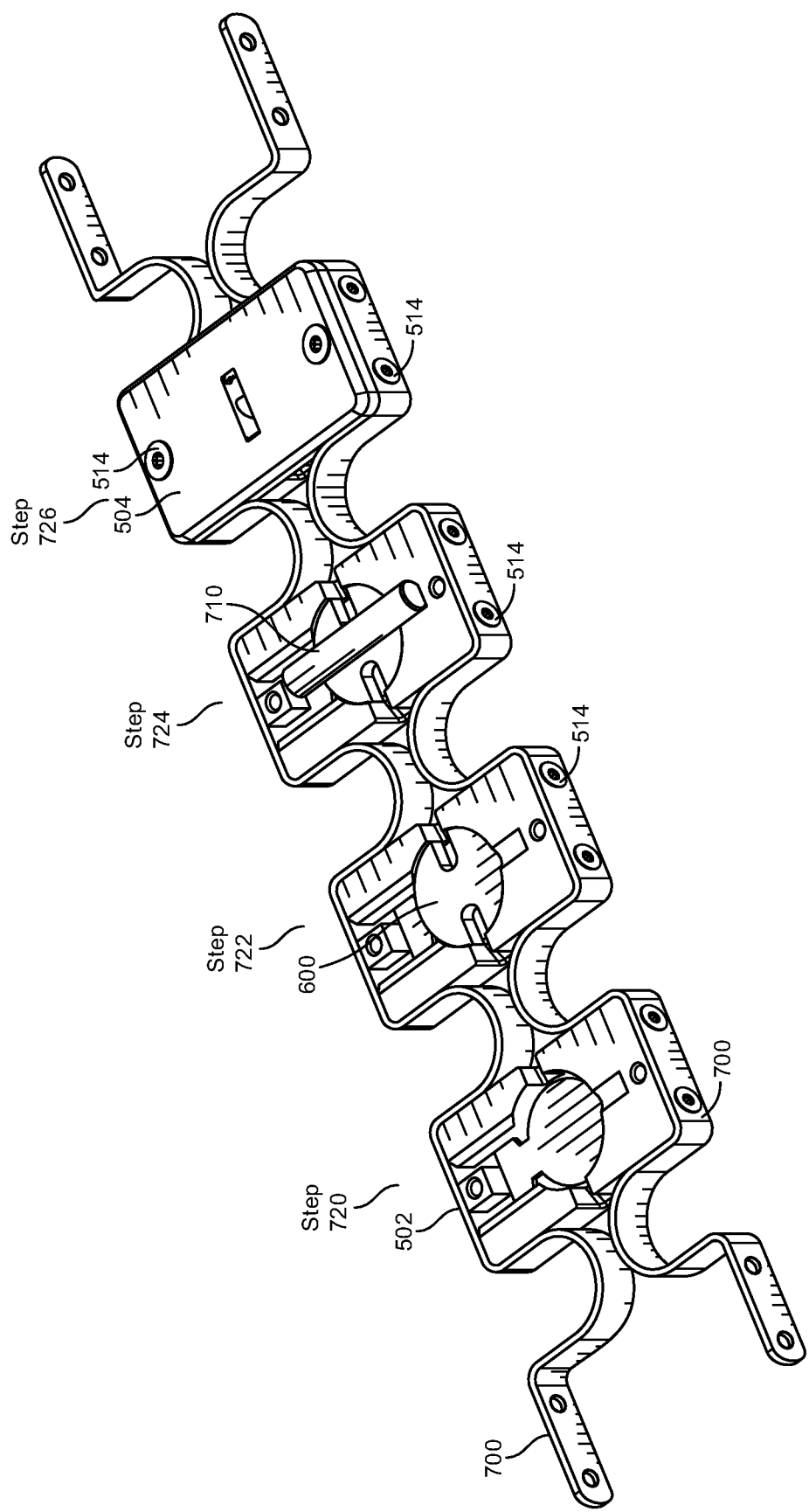
FIG. 11 is a perspective view of the device of FIG. 5 being constructed.

FIG. 11 is a perspective view of device 420 of FIG. 5 being constructed. More specifically, this illustration shows incremental steps in which device 420 of wearable apparatus 400 may be constructed. At step 720, two band element coupling components 700 are fastened to individual band elements 406 by way of lower modules 502 of band elements 406. At step 722, shock component 600 is seated within shock port 522 of lower module 502. At step 724, guide mechanism 710 (e.g., a pin, a dowel, or the like) is seated within guide mechanism channel 520 of lower module 502 atop shock component 600. At step 726, upper module 504 is fastened to lower module 502 with fasteners 514 thereby securing guide mechanism 710 in guide mechanism channel 520 of lower module 502 and guide mechanism channel 534 of upper module 504.

This embodiment merely intends to assist the reader in understanding the design of device 420. Typically, individual band elements 406 would be constructed beforehand and then attached to band element coupling component 700 to complete construction of device 420.

Figure 12:
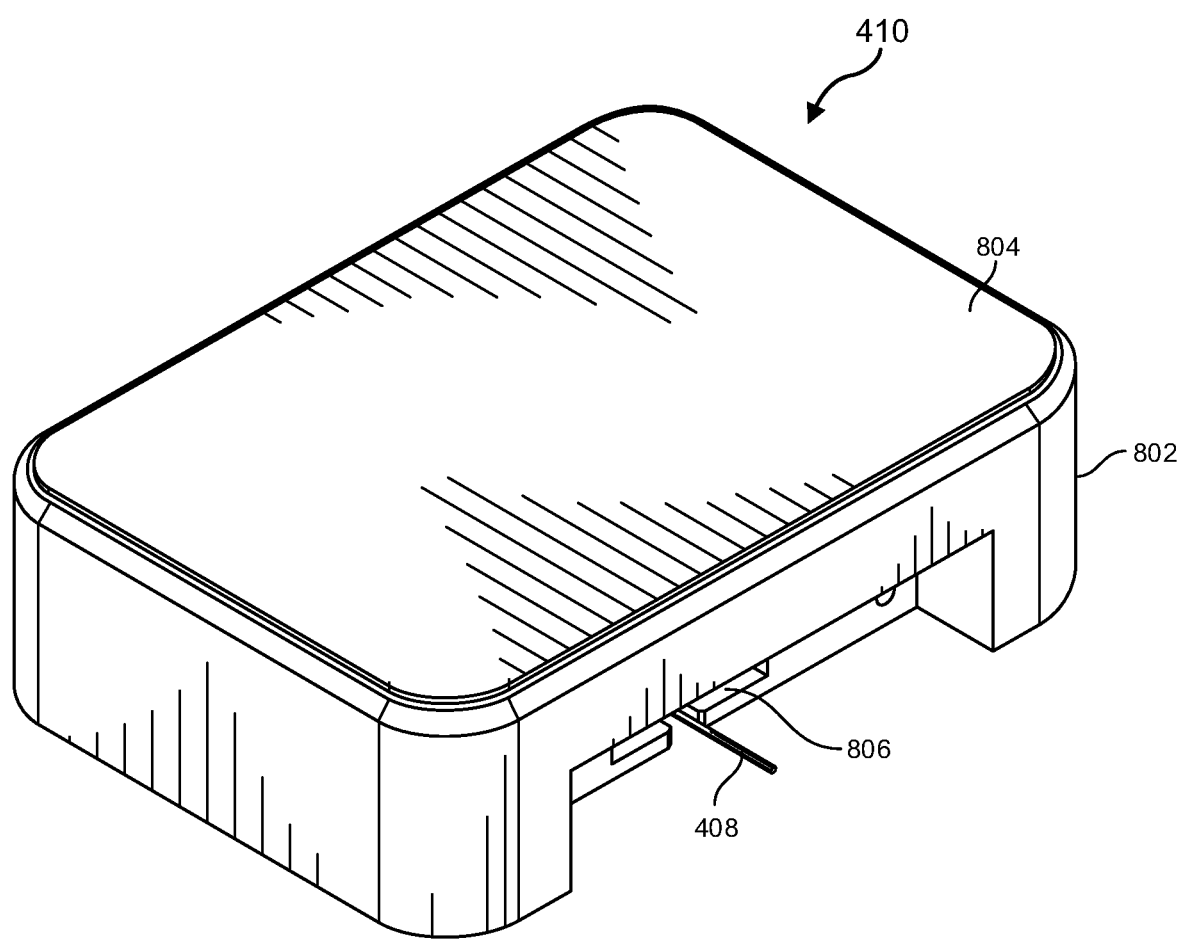
FIG. 12 is a perspective view of an example embodiment of a housing of the wearable apparatus of FIG. 4.

FIG. 12 is a perspective view of example embodiment of a housing 410 of wearable apparatus 400 of FIG. 4. In this embodiment, housing 410 is a completed component with an actuator, such as actuator 102 of FIG. 1, housed therein. Housing 410 includes an upper module 804 (e.g., a lid) and a lower module 802, which seats the actuator. The actuator may be seated in such a way that tensioning mechanism 408 runs through a substantial center of housing 410. In this regard, tensioning mechanism 408 may run through a substantial center of wearable apparatus 400 via exit/entrance slot 806 of housing 410 and along a perimeter of wearable apparatus 400 relative to a surface of the body part of the user. This configuration may also enable housing 410 to be centered on wearable apparatus 400.

Housing 410 may also be configured with comparable dimensions of individual band elements 406 so as to also perform as band element 406 when the actuator provides substantially tangential movement of tensioning mechanism 408. For example, when the actuator pulls tensioning mechanism 408 tighter about the user's body part, individual band elements 406 may compress about the user's body part.

Housing 410 may also compress similarly against the surface of the user's body part. Thus, in one embodiment, housing 410 may also be configured with a compression surface, such as compression surface 506 of FIG. 6, on the surface of housing 410 closest to the user's body part to provide comfort and substantially uniform distribution of orthogonal movement of housing 410 relative to the surface of the user body part.

Figure 13:
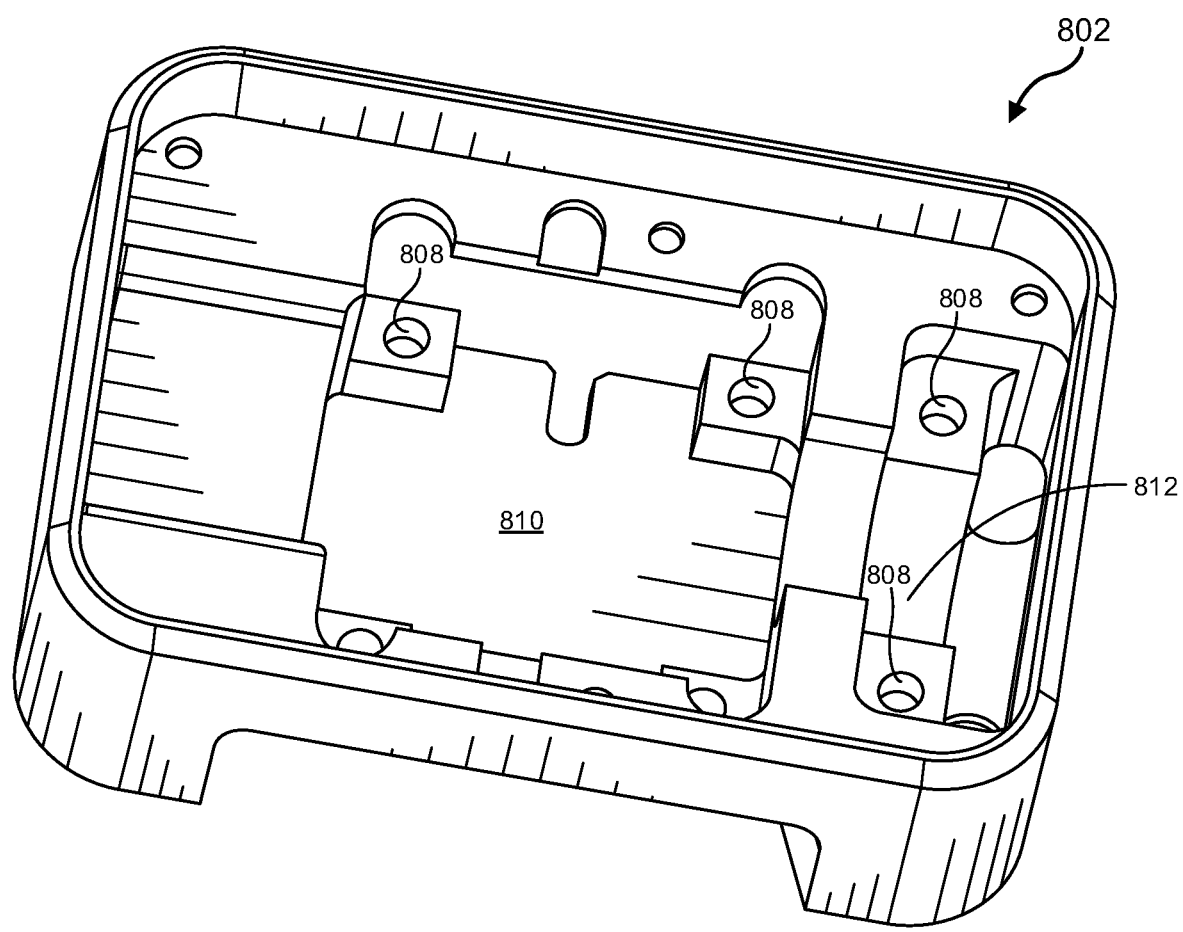
FIG. 13 is a perspective view of an example embodiment of a lower module of the housing of FIG. 12.

FIG. 13 is a perspective view of example embodiment of a lower module 802 of housing 410 of FIG. 12. Lower module 802 of housing 410 includes a variety of seats 810 and 812 that may be used to seat the actuator and a drive unit used to actuate tensioning mechanism 408. Lower module 802 of housing 410 may also include a variety of fastening points 808 that are used to secure the actuator within lower module 802 of housing 410.

Figure 14:
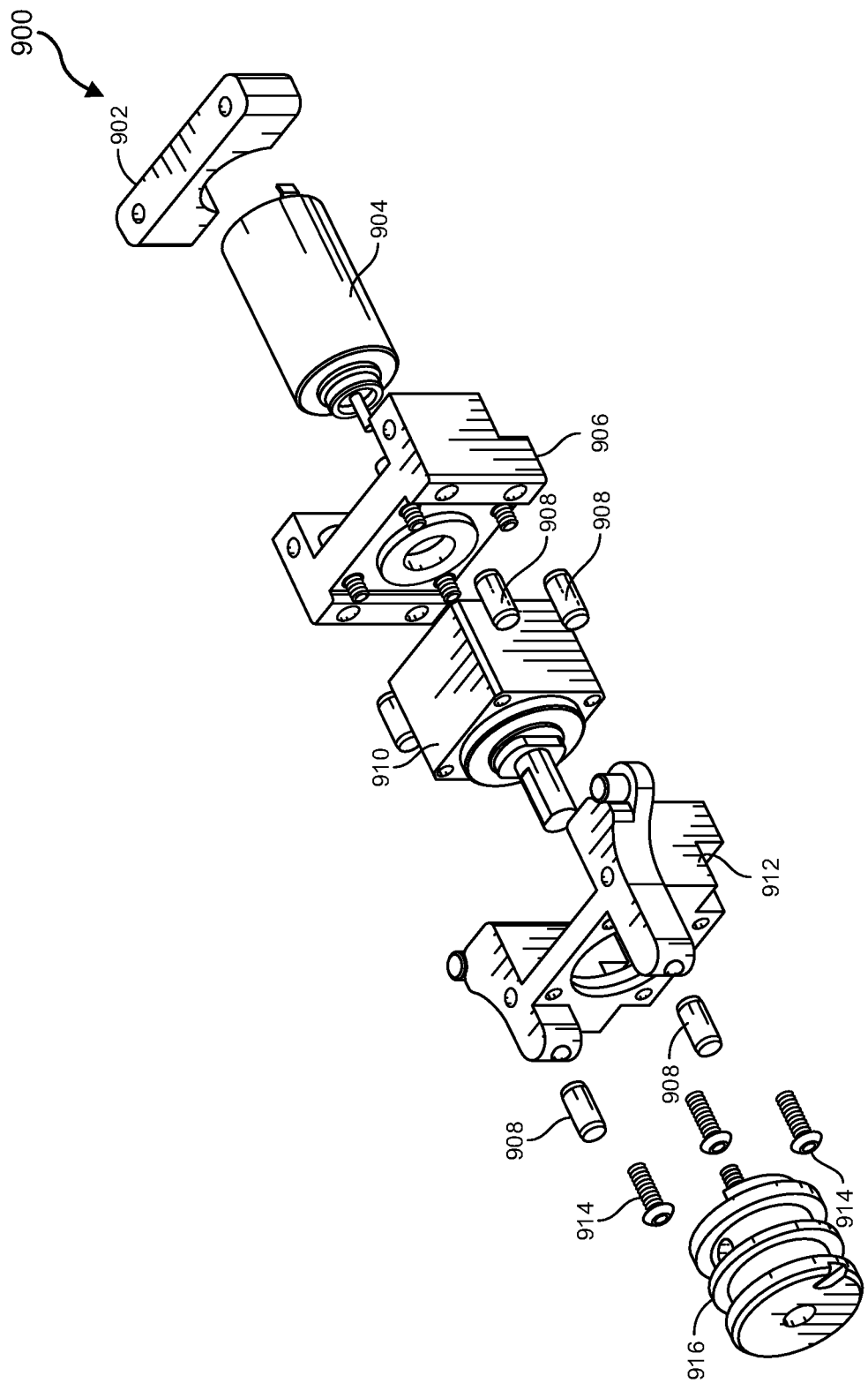
FIG. 14 is a perspective view of an example embodiment of a drive being constructed.

FIG. 14 is a perspective view of example embodiment of a drive 900 being constructed. In this embodiment, drive 900 includes motor 904 (e.g., a direct-current motor, a stepper motor, a servo motor, or the like) which may be representative of actuator 102 of FIG. 1. Drive 900 also includes drive unit 910. In one embodiment, drive unit 910 includes a harmonic drive. Harmonic drives are a type of "strain wave gearing" with a flexible "toothed" inner gear and a firm toothed outer gear that has two more teeth than the inner gear. Harmonic Drive gears provide little to no "backlash" (e.g., lost motion caused by gaps between gears). Thus, the harmonic drive may provide the user with a more natural feeling, as opposed to the jerking sensation that may be experienced with other drive systems. Harmonic drives are also known for reducing noise when compared to other drive systems.

Mounts 906 and 912 secure motor 904 and drive unit 910 within seat 810 of lower module 802 of housing 410. For example, an axle of motor 904 protrudes through an aperture of mount 906 with the aperture of mount 906 being dimensioned to retain a base of motor 904 around the axle of motor 904. The axle of motor 904 mechanically couples to drive unit 910. Mount 906 fastens to drive unit 910 to secure drive unit 910 to the axle of motor 904 protruding through aperture of mount 906 and mount 912 fastens to drive unit 910. Mounts 906 and 912 then fasten to fastening points 808 within lower module 802 of housing 410, thereby securing drive 900 within seat 810 of lower module 802 of housing 410.

Fasteners 914 may insure further stability of drive 900 within lower module 802 of housing 410 by mechanically fastening mounts 912 and 906 together. Bracket 902, dimensioned to fit about motor 904, may further secure drive 900 within lower module 802 of housing 410 by fastening to fastening points 808 of seat 812 and securing motor 904.

In this embodiment, drive 900 includes spool 916. Spool 916 may mechanically couple to drive unit 910 through an aperture of mount 912. Spool 916 attaches to an end of tensioning mechanism 408 to provide the substantially tangential movement of tensioning mechanism 408 relative to a surface of the user's body part. For example, when motor 904 operates (e.g., in response to an indication from a processing system), the axle of motor 904 may rotate and drive drive unit 910. Spool 916 being mechanically coupled to drive unit 910 may in turn rotate. With tensioning mechanism 408 attached to spool 916, spool 916 wraps tensioning mechanism 408 about spool 916 thereby pulling tensioning mechanism 408 along a perimeter of device 420.

Guide mechanisms 908, such as dowels, may be fastened to various points on drive 900 to direct tensioning mechanism 408 through a substantial center of housing 410. An example of such is shown and described in the fully constructed drive 900 of FIG. 15.

Figure 15:
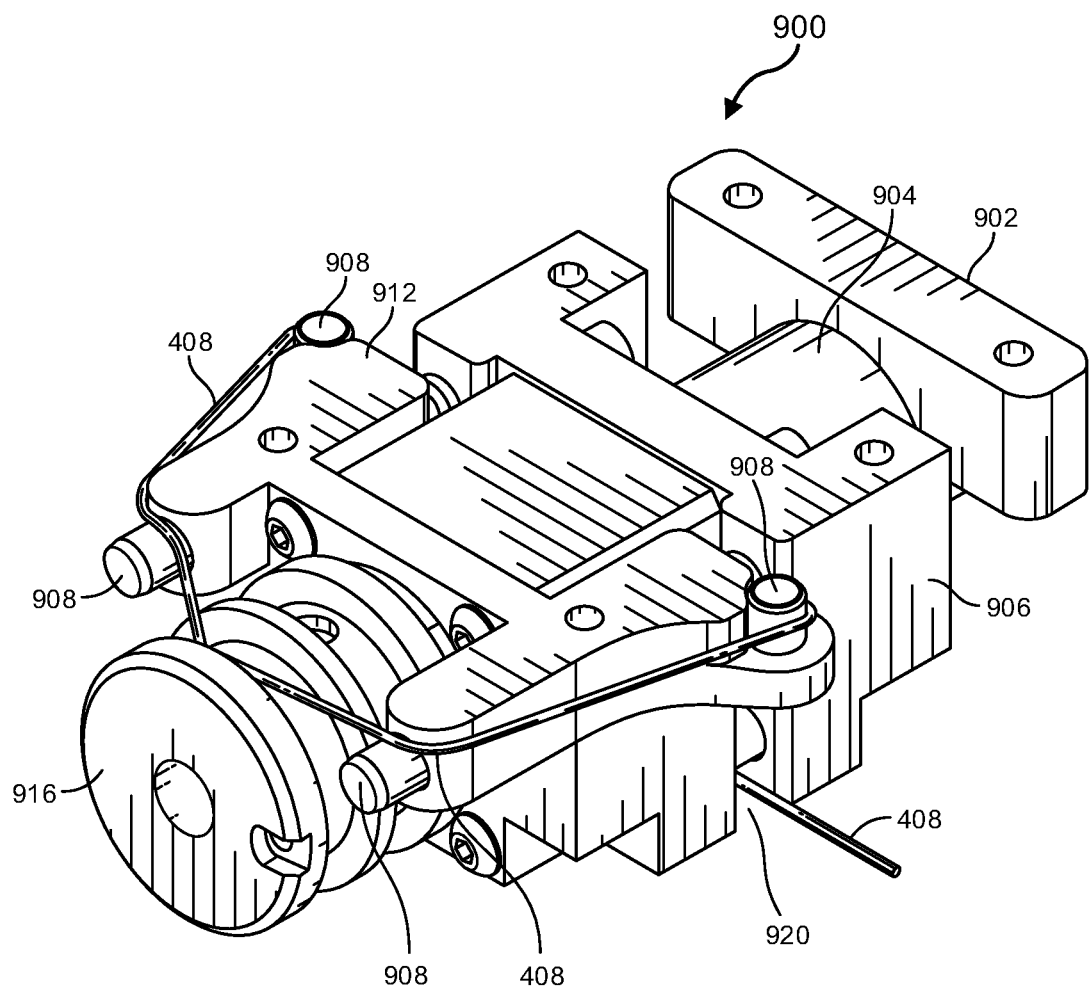
FIG. 15 is a perspective view of an example embodiment of a constructed drive that resides in the housing of FIG. 12.

FIG. 15 is a perspective view of example embodiment of a constructed drive 900 that resides in housing 410 of FIG. 12. In this embodiment, guide mechanisms 908 are mechanically coupled to mount 912 to direct tensioning mechanism 408 through a relative center of drive 900 and about spool 916. In one embodiment, drive 900 is positioned at a relative center of housing 410, and guide mechanisms 908 direct tensioning mechanism 408 through housing 410. Drive 900 may gather slack in tensioning mechanism 408 at slack point 920. For example, as spool 916 rotates and pulls tensioning mechanism 408 to compress device 420 about the user's body part, guide mechanisms 908 direct excess line in tensioning mechanism 408 through slack point 920 where the excess line is ultimately collected by spool 916. When spool 916 rotates in an opposite direction, spool 916 creates slack in tensioning mechanism 408 where guide mechanisms 908 direct the slack through slack point 920, thereby loosening device 420.

As noted above, drive 900 may be configured in a variety of ways as a matter of design choice and that drive 900 is merely an example. For example, drive 900 may be configured with a lead screw to which tensioning mechanism 408 mechanically couples. Motor 904 may then be used to rotate the lead screw and pull tensioning mechanism 408. Other embodiments may be configured with rack and pinion actuation, gearing mechanisms, and the like.

Figure 16:
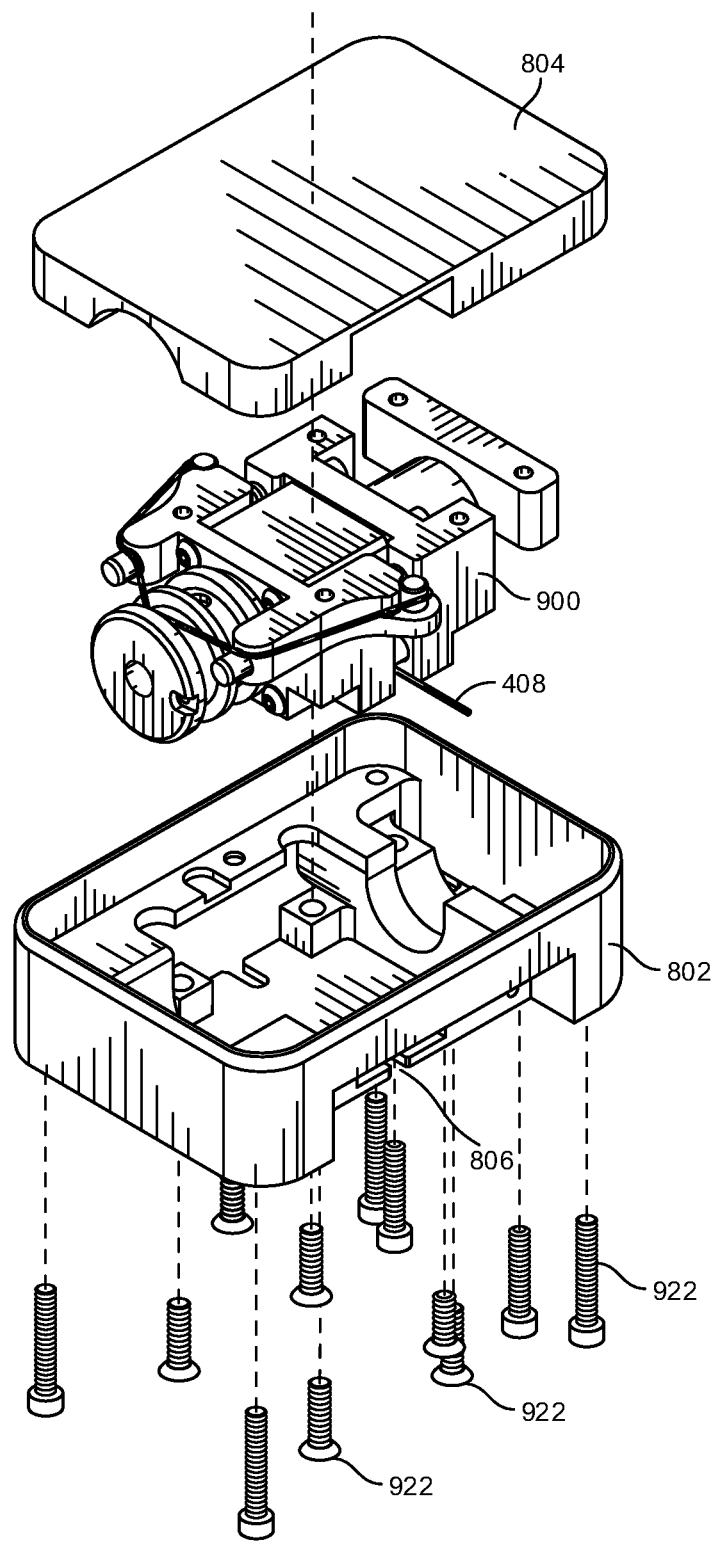
FIG. 16 is a perspective view of the housing of FIG. 12 being constructed with the drive of FIG. 15.

FIG. 16 is a perspective view of the housing of FIG. 12 being constructed with drive 900 of FIG. 15. In this embodiment, the fully constructed drive 900 seats within lower module 802 of housing 410 and tensioning mechanism 408 is routed from drive 900 through exit/entrance slot 806 of lower module 802 of housing 410. Various fasteners 922 secure drive 900 within lower module 802. And, upper module 804 of housing 410 encloses drive 900 within housing 410. This configuration ensures that drive 900 is at least somewhat protected from external environmental elements. This configuration also reduces noise of wearable apparatus 400. For example, in an embodiment in which actuator 102 of FIG. 1 is configured as a motor, such as motor 904 of FIG. 14, housing 410 may reduce noise from the motor to provide the user with a relatively interference free experience.

The embodiments herein may find certain advantages in an artificial reality environment, such as providing a more realistic sensation being grabbed. But, the embodiments herein may also be used in a variety of other environments, including but not limited to simulators, robotics, and any suitable environment where substantially orthogonal movement of a device relative to a perimeter to which the device fits is desired, including items other than body parts.

In this regard, FIG. 17 is a block diagram of an exemplary HMD system 1000 (e.g., a type of mobile artificial reality system) that may present virtual scenes (e.g., captured scenes, artificially-generated scenes, or a combination thereof) to a user. HMD system 1000 may operate in a VR system environment, an AR system environment, an MR system environment, or some combination thereof. HMD system 1000 shown in FIG. 1 may include an HMD device 1005 that includes or communicates with a processing subsystem 1010 and an input/output (I/O) interface 1015. HMD device 1005 may completely obstruct the user's view of the real-world environment, in some embodiments. Other embodiments may only partially obstruct the user's view of the real-world environment and/or may obstruct the user's view depending on content being displayed in a display of HMD device 1005.

While FIG. 17 shows an exemplary HMD system 1000 that includes at least one HMD device 1005 and at least one I/O interface 1015, in other embodiments any number of these components may be included in HMD system 1000. For example, HMD system 1000 may include multiple HMD devices 1005, each having an associated I/O interface 1015, with each HMD device 1005 and I/O interface 1015 communicating with processing subsystem 1010. In embodiments in which processing subsystem 1010 is not included within, or otherwise integrated with, HMD device 1005, HMD device 1005 may communicate with processing subsystem 1010 over a wired connection or a wireless connection. In alternative configurations, different and/or additional components may be included in HMD system 1000. Additionally, functionality described in connection with one or more of the components shown in FIG. 17 may be distributed among the components in a different manner than that described with respect to FIG. 17, in some embodiments.

HMD device 1005 may present a variety of content to a user, including virtual views of an artificially rendered virtual-world environment and/or augmented views of a physical, real-world environment. Augmented views may be augmented with computer-generated elements (e.g., two-dimensional (2D) or three-dimensional (3D) images, 2D or 3D video, sound, etc.). In some embodiments, the presented content may include audio that is provided via an internal or external device (e.g., speakers and/or headphones) that receives audio information from HMD device 1005, processing subsystem 1010, or both, and presents audio data based on the audio information. In some embodiments, the speakers and/or headphones may be integrated into, or releasably coupled or attached to, HMD device 1005. HMD device 1005 may include one or more bodies, which may be rigidly or non-rigidly coupled together. A rigid coupling between rigid bodies may cause the coupled rigid bodies to act as a single rigid entity. In contrast, a non-rigid coupling between rigid bodies may allow the rigid bodies to move relative to each other.

In some examples, HMD device 1005 may include a depth-sensing subsystem 1020 (e.g., a depth camera subsystem), an electronic display 1025, an image capture subsystem 1030 that includes one or more cameras, one or more position sensors 1035, and/or an inertial measurement unit (IMU) 1040. One or more of these components may provide a positioning subsystem of HMD device 1005 that can determine the position of HMD device 1005 relative to a real-world environment and individual features contained therein. Other embodiments of HMD device 1005 may include an optional eye-tracking or gaze-estimation system configured to track the eyes of a user of HMD device 1005 to estimate the user's gaze. Some embodiments of HMD device 1005 may have different components than those described in conjunction with FIG. 17.

Depth-sensing subsystem 1020 may capture data describing depth information characterizing a local real-world area or environment surrounding some or all of HMD device 1005. In some embodiments, depth-sensing subsystem 1020 may characterize a position and/or velocity of depth-sensing subsystem 1020 (and thereby of HMD device 1005) within the local area. Depth-sensing subsystem 1020, in some examples, may compute a depth map using collected data (e.g., based on captured light according to one or more computer-vision schemes or algorithms, by processing a portion of a structured light pattern, by time-of-flight (ToF) imaging, simultaneous localization and mapping (SLAM), etc.), or depth-sensing subsystem 1020 can transmit this data to another device, such as an external implementation of processing subsystem 1010, that may generate a depth map using the data from depth-sensing subsystem 1020. As described herein, the depth maps may be used to generate a model of the environment surrounding HMD device 1005. Accordingly, depth-sensing subsystem 1020 may be referred to as a localization and modeling subsystem or may be a part of such a subsystem.

Electronic display 1025 may display 2D or 3D images to the user in accordance with data received from processing subsystem 1010. In various embodiments, electronic display 1025 may include a single electronic display or multiple electronic displays (e.g., a display for each eye of the user). Examples of electronic display 1025 may include, but are not limited to, a liquid crystal display (LCD), an organic light-emitting diode (OLED) display, an inorganic light-emitting diode (ILED) display, an active-matrix organic light-emitting diode (AMOLED) display, a transparent organic light-emitting diode (TOLED) display, another suitable display, or some combination thereof. In some examples, electronic display 1025 may be opaque such that the user cannot see the local environment through electronic display 1025.

Image capture subsystem 1030 may include one or more optical image sensors or cameras that capture and collect image data from the local environment. In some embodiments, the sensors included in image capture subsystem 1030 may provide stereoscopic views of the local environment that may be used by processing subsystem 1010 to generate image data that characterizes the local environment and/or a position and orientation of HMD device 1005 within the local environment. In some embodiments, the image data may be processed by processing subsystem 1010 or another component of image capture subsystem 1030 to generate a three-dimensional view of the local environment. For example, image capture subsystem 1030 may include SLAM cameras or other cameras that include a wide-angle lens system that captures a wider field-of-view than may be captured by the eyes of the user.

In some embodiments, processing subsystem 1010 may process the images captured by image capture subsystem 1030 to extract various aspects of the visual appearance of the local real-world environment. For example, image capture subsystem 1030 may capture color images of the real-world environment that provide information regarding the visual appearance of various features within the real-world environment. Image capture subsystem 1030 may capture the color, patterns, etc. of the walls, the floor, the ceiling, paintings, pictures, fabric textures, etc., in the room. These visual aspects may be encoded and stored in a database. Processing subsystem 1010 may associate these aspects of visual appearance with specific portions of the model of the real-world environment so that the model can be rendered with the same or similar visual appearance at a later time.

IMU 1040, in some examples, may represent an electronic subsystem that generates data indicating a position and/or orientation of HMD device 1005 based on measurement signals received from one or more of position sensors 1035 and/or from depth information received from depth-sensing subsystem 1020 and/or image capture subsystem 1030. For example, position sensors 1035 may generate one or more measurement signals in response to the motion of HMD device 1005. Examples of position sensors 1035 include one or more accelerometers, one or more gyroscopes, one or more magnetometers, another suitable type of sensor that detects motion, a type of sensor used for error correction of IMU 1040, or some combination thereof. Position sensors 1035 may be located external to IMU 1040, internal to IMU 1040, or some combination thereof.

Based on the one or more measurement signals from one or more of position sensors 1035, IMU 1040 may generate data indicating an estimated current position, elevation, and/or orientation of HMD device 1005 relative to an initial position and/or orientation of HMD device 1005. This information may be used to generate a personal zone that can be used as a proxy for the user's position within the local environment. For example, position sensors 1035 may include multiple accelerometers to measure translational motion (forward/back, up/down, left/right) and multiple gyroscopes to measure rotational motion (e.g., pitch, yaw, roll). As described herein, image capture subsystem 1030 and/or depth-sensing subsystem 1020 may generate data indicating an estimated current position and/or orientation of HMD device 1005 relative to the real-world environment in which HMD device 1005 is used.

I/O interface 1015 may represent a subsystem or device that allows a user to send action requests and receive responses from processing subsystem 1010 and/or a hand-secured or handheld controller 1070. In some embodiments, I/O interface 1015 may facilitate communication with more than one handheld controller 1070. For example, the user may have two handheld controllers 1070, with one in each hand. An action request may, in some examples, represent a request to perform a particular action. For example, an action request may be an instruction to start or end the capture of image or video data, an instruction to perform a particular action within an application, or an instruction to start or end a boundary definition state. I/O interface 1015 may include one or more input devices or may enable communication with one or more input devices. Exemplary input devices may include, but are not limited to, a keyboard, a mouse, a handheld controller (which may include a glove or a bracelet), or any other suitable device for receiving action requests and communicating the action requests to processing subsystem 1010.

An action request received by I/O interface 1015 may be communicated to processing subsystem 1010, which may perform an action corresponding to the action request. In some embodiments, handheld controller 1070 may include a separate IMU 1040 that captures inertial data indicating an estimated position of handheld controller 1070 relative to an initial position. In some embodiments, I/O interface 1015 and/or handheld controller 1070 may provide haptic feedback to the user in accordance with instructions received from processing subsystem 1010 and/or HMD device 1005. For example, haptic feedback may be provided when an action request is received or when processing subsystem 1010 communicates instructions to I/O interface 1015, which may cause handheld controller 1070 to generate or direct generation of haptic feedback when processing subsystem 1010 performs an action.

Processing subsystem 1010 may include one or more processing devices or physical processors that provide content to HMD device 1005 in accordance with information received from one or more of depth-sensing subsystem 1020, image capture subsystem 1030, IMU 1040, I/O interface 1015, and/or handheld controller 1070. In the example shown in FIG. 17, processing subsystem 1010 may include an image processing engine 1060, an application store 1050, and a tracking module 1055. Some embodiments of processing subsystem 1010 may have different modules or components than those described in conjunction with FIG. 17. Similarly, the functions further described herein may be distributed among the components of HMD system 1000 in a different manner than described in conjunction with FIG. 17.

Application store 1050 may store one or more applications for execution by processing subsystem 1010. An application may, in some examples, represent a group of instructions that, when executed by a processor, generates content for presentation to the user. Such content may be generated in response to inputs received from the user via movement of HMD device 1005 and/or handheld controller 1070. Examples of such applications may include gaming applications, conferencing applications, video playback applications, social media applications, and/or any other suitable applications.

Tracking module 1055 may calibrate HMD system 1000 using one or more calibration parameters and may adjust one or more of the calibration parameters to reduce error when determining the position of HMD device 1005 and/or handheld controller 1070. For example, tracking module 1055 may communicate a calibration parameter to depth-sensing subsystem 1020 to adjust the focus of depth-sensing subsystem 1020 to more accurately determine positions of structured light elements captured by depth-sensing subsystem 1020. Calibration performed by tracking module 1055 may also account for information received from IMU 1040 in HMD device 1005 and/or another IMU 1040 included in handheld controller 1070. Additionally, if tracking of HMD device 1005 is lost or compromised (e.g., if depth-sensing subsystem 1020 loses line-of-sight of at least a threshold number of structured light elements), tracking module 1055 may recalibrate some or all of HMD system 1000.

Tracking module 1055 may track movements of HMD device 1005 and/or handheld controller 1070 using information from depth-sensing subsystem 1020, image capture subsystem 1030, the one or more position sensors 1035, IMU 1040, or some combination thereof. For example, tracking module 1055 may determine a position of a reference point of HMD device 1005 in a mapping of the real-world environment based on information collected with HMD device 1005. Additionally, in some embodiments, tracking module 1055 may use portions of data indicating a position and/or orientation of HMD device 1005 and/or handheld controller 1070 from IMU 1040 to predict a future position and/or orientation of HMD device 1005 and/or handheld controller 1070. Tracking module 1055 may also provide the estimated or predicted future position of HMD device 1005 and/or I/O interface 1015 to image processing engine 1060.

In some embodiments, tracking module 1055 may track other features that can be observed by depth-sensing subsystem 1020, image capture subsystem 1030, and/or another system. For example, tracking module 1055 may track one or both of the user's hands so that the location of the user's hands within the real-world environment may be known and utilized. To simplify the tracking of the user within the real-world environment, tracking module 1055 may generate and/or use a proxy for the user. The proxy can define a personal zone associated with the user, which may provide an estimate of the volume occupied by the user. Tracking module 1055 may monitor the user's position in relation to various features of the environment by monitoring the user's proxy or personal zone in relation to the environment. Tracking module 1055 may also receive information from one or more eye-tracking cameras included in some embodiments of HMD device 1005 to track the user's gaze.

Image processing engine 1060 may generate a three-dimensional mapping of the area surrounding some or all of HMD device 1005 (i.e., the "local area" or "real-world environment") based on information received from HMD device 1005. In some embodiments, image processing engine 1060 may determine depth information for the three-dimensional mapping of the local area based on information received from depth-sensing subsystem 1020 that is relevant for techniques used in computing depth. Image processing engine 1060 may calculate depth information using one or more techniques in computing depth from structured light. In various embodiments, image processing engine 1060 may use the depth information, e.g., to generate and/or update a model of the local area and generate content based in part on the updated model. Image processing engine 1060 may also extract aspects of the visual appearance of a scene so that a model of the scene may be more accurately rendered at a later time, as described herein.

Image processing engine 1060 may also execute applications within HMD system 1000 and receive position information, acceleration information, velocity information, predicted future positions, or some combination thereof, of HMD device 1005 from tracking module 1055. Based on the received information, image processing engine 1060 may identify content to provide to HMD device 1005 for presentation to the user. For example, if the received information indicates that the user has looked to the left, image processing engine 1060 may generate content for HMD device 1005 that corresponds to the user's movement in a virtual environment or in an environment augmenting the local area with additional content. To provide the user with awareness of his or her surroundings, image processing engine 1060 may present a combination of the virtual environment and the model of the real-world environment. Additionally, image processing engine 1060 may perform an action within an application executing on processing subsystem 1010 in response to an action request received from I/O interface 1015 and/or handheld controller 1070 and provide visual, audible, and/or haptic feedback to the user that the action was performed.

As noted, embodiments of the instant disclosure may include or be implemented in conjunction with various types of artificial reality systems. Artificial reality is a form of reality that has been adjusted in some manner before presentation to a user, which may include, e.g., a VR, an AR, an MR, a hybrid reality, or some combination and/or derivative thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial reality systems may be implemented in a variety of different form factors and configurations. Some artificial reality systems may be designed to work without near-eye displays (NEDs), an example of which is AR system 1100 in FIG. 18. Other artificial reality systems may include a NED that also provides visibility into the real world (e.g., AR system 1200 in FIG. 19) or that visually immerses a user in an artificial reality (e.g., VR system 1300 in FIG. 20). While some artificial reality devices may be self-contained systems, other artificial reality devices may communicate and/or coordinate with external devices to provide an artificial reality experience to a user. Examples of such external devices include handheld controllers, mobile devices, desktop computers, devices worn by a user, devices worn by one or more other users, and/or any other suitable external system.

Turning to FIG. 18, AR system 1100 generally represents a wearable device dimensioned to fit about a body part (e.g., a head) of a user. As shown in FIG. 18, system 1100 may include a frame 1102 and a camera assembly 1104 that is coupled to frame 1102 and configured to gather information about a local environment by observing the local environment. AR system 1100 may also include one or more audio devices, such as output audio transducers 1108(A) and 1108(B) and input audio transducers 1110. Output audio transducers 1108(A) and 1108(B) may provide audio feedback and/or content to a user, and input audio transducers 1110 may capture audio in a user's environment.

As shown, AR system 1100 may not necessarily include a NED positioned in front of a user's eyes. AR systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While AR system 1100 may not include a NED, AR system 1100 may include other types of screens or visual feedback devices (e.g., a display screen integrated into a side of frame 1102).

The embodiments discussed in this disclosure may also be implemented in AR systems that include one or more NEDs. For example, as shown in FIG. 19, AR system 1200 may include an eyewear device 1202 with a frame 1210 configured to hold a left display device 1215(A) and a right display device 1215(B) in front of a user's eyes. Display devices 1215(A) and 1215(B) may act together or independently to present an image or series of images to a user. While AR system 1200 includes two displays, embodiments of this disclosure may be implemented in AR systems with a single NED or more than two NEDs.

In some embodiments, AR system 1200 may include one or more sensors, such as sensor 1240. Sensor 1240 may generate measurement signals in response to motion of AR system 1200 and may be located on substantially any portion of frame 1210. Sensor 1240 may include a position sensor, an inertial measurement unit (IMU), a depth camera assembly, or any combination thereof. In some embodiments, AR system 1200 may or may not include sensor 1240 or may include more than one sensor. In embodiments in which sensor 1240 includes an IMU, the IMU may generate calibration data based on measurement signals from sensor 1240. Examples of sensor 1240 may include, without limitation, accelerometers, gyroscopes, magnetometers, other suitable types of sensors that detect motion, sensors used for error correction of the IMU, or some combination thereof.

AR system 1200 may also include a microphone array with a plurality of acoustic sensors 1220(A)-1220(J), referred to collectively as acoustic sensors 1220. Acoustic sensors 1220 may be transducers that detect air pressure variations induced by sound waves. Each acoustic sensor 1220 may be configured to detect sound and convert the detected sound into an electronic format (e.g., an analog or digital format). The microphone array in FIG. 19 may include, for example, ten acoustic sensors: 1220(A) and 1220(B), which may be designed to be placed inside a corresponding ear of the user, acoustic sensors 1220(C), 1220(D), 1220(E), 1220(F), 1220(G), and 1220(H), which may be positioned at various locations on frame 1210, and/or acoustic sensors 1220(I) and 1220(J), which may be positioned on a corresponding neckband 1205.

The configuration of acoustic sensors 1220 of the microphone array may vary. While AR system 1200 is shown in FIG. 19 as having ten acoustic sensors 1220, the number of acoustic sensors 1220 may be greater or less than ten. In some embodiments, using higher numbers of acoustic sensors 1220 may increase the amount of audio information collected and/or the sensitivity and accuracy of the audio information. In contrast, using a lower number of acoustic sensors 1220 may decrease the computing power required by the controller 1250 to process the collected audio information. In addition, the position of each acoustic sensor 1220 of the microphone array may vary. For example, the position of an acoustic sensor 1220 may include a defined position on the user, a defined coordinate on the frame 1210, an orientation associated with each acoustic sensor, or some combination thereof.

Acoustic sensors 1220(A) and 1220(B) may be positioned on different parts of the user's ear, such as behind the pinna or within the auricle or fossa. Or, there may be additional acoustic sensors on or surrounding the ear in addition to acoustic sensors 1220 inside the ear canal. Having an acoustic sensor positioned next to an ear canal of a user may enable the microphone array to collect information on how sounds arrive at the ear canal. By positioning at least two of acoustic sensors 1220 on either side of a user's head (e.g., as binaural microphones), AR device 1200 may simulate binaural hearing and capture a 3D stereo sound field around about a user's head. In some embodiments, the acoustic sensors 1220(A) and 1220(B) may be connected to the AR system 1200 via a wired connection, and in other embodiments, the acoustic sensors 1220(A) and 1220(B) may be connected to the AR system 1200 via a wireless connection (e.g., a Bluetooth connection). In still other embodiments, the acoustic sensors 1220(A) and 1220(B) may not be used at all in conjunction with the AR system 1200.

Acoustic sensors 1220 on frame 1210 may be positioned along the length of the temples, across the bridge, above or below display devices 1215(A) and 1215(B), or some combination thereof. Acoustic sensors 1220 may be oriented such that the microphone array is able to detect sounds in a wide range of directions surrounding the user wearing the AR system 1200. In some embodiments, an optimization process may be performed during manufacturing of AR system 1200 to determine relative positioning of each acoustic sensor 1220 in the microphone array.

AR system 1200 may further include or be connected to an external device. (e.g., a paired device), such as neckband 1205. As shown, neckband 1205 may be coupled to eyewear device 1202 via one or more connectors 1230. The connectors 1230 may be wired or wireless connectors and may include electrical and/or non-electrical (e.g., structural) components. In some cases, the eyewear device 1202 and the neckband 1205 may operate independently without any wired or wireless connection between them. While FIG. 19 illustrates the components of eyewear device 1202 and neckband 1205 in example locations on eyewear device 1202 and neckband 1205, the components may be located elsewhere and/or distributed differently on eyewear device 1202 and/or neckband 1205. In some embodiments, the components of the eyewear device 1202 and neckband 1205 may be located on one or more additional peripheral devices paired with eyewear device 1202, neckband 1205, or some combination thereof. Furthermore, neckband 1205 generally represents any type or form of paired device. Thus, the following discussion of neckband 1205 may also apply to various other paired devices, such as smart watches, smart phones, wrist bands, other wearable devices, handheld controllers, tablet computers, laptop computers, etc.

Pairing external devices, such as neckband 1205, with AR eyewear devices may enable the eyewear devices to achieve the form factor of a pair of glasses while still providing sufficient battery and computation power for expanded capabilities. Some or all of the battery power, computational resources, and/or additional features of AR system 1200 may be provided by a paired device or shared between a paired device and an eyewear device, thus reducing the weight, heat profile, and form factor of the eyewear device overall while still retaining desired functionality. For example, neckband 1205 may allow components that would otherwise be included on an eyewear device to be included in neckband 1205 since users may tolerate a heavier weight load on their shoulders than they would tolerate on their heads. Neckband 1205 may also have a larger surface area over which to diffuse and disperse heat to the ambient environment. Thus, neckband 1205 may allow for greater battery and computation capacity than might otherwise have been possible on a stand-alone eyewear device. Since weight carried in neckband 1205 may be less invasive to a user than weight carried in eyewear device 1202, a user may tolerate wearing a lighter eyewear device and carrying or wearing the paired device for greater lengths of time than the user would tolerate wearing a heavy standalone eyewear device, thereby enabling an artificial reality environment to be incorporated more fully into a user's day-to-day activities.

Neckband 1205 may be communicatively coupled with eyewear device 1202 and/or to other devices. The other devices may provide certain functions (e.g., tracking, localizing, depth mapping, processing, storage, etc.) to the AR system 1200. In the embodiment of FIG. 19, neckband 1205 may include two acoustic sensors (e.g., 1220(I) and 1220(J)) that are part of the microphone array (or potentially form their own microphone subarray). Neckband 1205 may also include a controller 1225 and a power source 1235.

Acoustic sensors 1220(I) and 1220(J) of neckband 1205 may be configured to detect sound and convert the detected sound into an electronic format (analog or digital). In the embodiment of FIG. 19, acoustic sensors 1220(I) and 1220 (J) may be positioned on neckband 1205, thereby increasing the distance between the neckband acoustic sensors 1220(I) and 1220(J) and other acoustic sensors 1220 positioned on eyewear device 1202. In some cases, increasing the distance between acoustic sensors 1220 of the microphone array may improve the accuracy of beamforming performed via the microphone array. For example, if a sound is detected by acoustic sensors 1220(C) and 1220(D) and the distance between acoustic sensors 1220(C) and 1220(D) is greater than, e.g., the distance between acoustic sensors 1220(D) and 1220(E), the determined source location of the detected sound may be more accurate than if the sound had been detected by acoustic sensors 1220(D) and 1220(E).

Controller 1225 of neckband 1205 may process information generated by the sensors on neckband 1205 and/or AR system 1200. For example, controller 1225 may process information from the microphone array that describes sounds detected by the microphone array. For each detected sound, controller 1225 may perform a DoA estimation to estimate a direction from which the detected sound arrived at the microphone array. As the microphone array detects sounds, controller 1225 may populate an audio data set with the information. In embodiments in which AR system 1200 includes an inertial measurement unit, controller 1225 may compute all inertial and spatial calculations from the IMU located on eyewear device 1202. Connector 1230 may convey information between AR system 1200 and neckband 1205 and between AR system 1200 and controller 1225. The information may be in the form of optical data, electrical data, wireless data, or any other transmittable data form. Moving the processing of information generated by AR system 1200 to neckband 1205 may reduce weight and heat in eyewear device 1202, making it more comfortable to the user.

Power source 1235 in neckband 1205 may provide power to eyewear device 1202 and/or to neckband 1205. Power source 1235 may include, without limitation, lithium ion batteries, lithium-polymer batteries, primary lithium batteries, alkaline batteries, or any other form of power storage. In some cases, power source 1235 may be a wired power source. Including power source 1235 on neckband 1205 instead of on eyewear device 1202 may help better distribute the weight and heat generated by power source 1235.

As noted, some artificial reality systems may, instead of blending an artificial reality with actual reality, substantially replace one or more of a user's sensory perceptions of the real world with a virtual experience. One example of this type of system is a head-worn display system, such as VR system 1300 in FIG. 20, that mostly or completely covers a user's field of view. VR system 1300 may include a front rigid body 1302 and a band 1304 shaped to fit around a user's head. VR system 1300 may also include output audio transducers 1306(A) and 1306(B). Furthermore, while not shown in FIG. 20, front rigid body 1302 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in AR system 1200 and/or VR system 1300 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in AR system 1200 and/or VR system 1300 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, AR system 1100, AR system 1200, and/or VR system 1300 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 18 and 20, output audio transducers 1108(A), 1108(B), 1306(A), and 1306(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 1110 may include condenser microphones, dynamic microphones, ribbon microphones, and/or any other type or form of input transducer. In some embodiments, a single transducer may be used for both audio input and audio output.

While not shown in FIGS. 18-20, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

Embodiments of the present disclosure may include systems and methods for providing and operating a wearable apparatus that compresses against a surface of a user's body part in a substantially orthogonal manner relative to the surface of user's body part. For example, an actuator may actuate a tensioning mechanism that is harnessed to a device that fits about a user's body part. The tensioning mechanism, when actuated, draws the device in contact with a surface of the user's body part and compresses against the user's body part in a substantially uniform manner. That is, the orthogonal movement of the device relative to a surface of the user's body part may be evenly distributed about the surface of the user's body part. This provides the user with a more natural feeling, particularly when used in an artificial reality environment. For example, when a user immersed in an artificial reality environment is grabbed by an actor in the artificial reality environment, the user may feel more like the user is being grabbed in a real-world environment. Other advantages can be found in the above illustrated designs themselves, including the use of a harmonic drive that provides more fluid tensioning of the device, a housing that reduces noise of any actuating mechanisms being employed, and guidance of the tensioning mechanism through a relative center of the device to avoid shearing.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive sensor data (e.g., from depth-sensing subsystem 1020) to be transformed, transform the sensor data to represent physical surfaces within a real-world environment, output a result of the transformation to define a safety boundary for a user, use the safety boundary to alert the user to a potential collision of the user with the real-world environment, and store the result of the transformation for future use when the user is to operate with the same real-world environment. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A wearable device, comprising:
   a wearable structure dimensioned to fit about a body part of a user;
   a plurality of band elements, attached to the wearable structure, that are configured to substantially surround the body part of the user when the user dons the wearable structure, wherein one or more of the band elements comprise one or more vibrotactors configured to provide haptic feedback to the user;
   an actuator that is coupled to one or more band elements of the plurality of band elements, the actuator being configured to tighten the plurality of band elements around the body part of the user when transitioned from an unactuated state to an actuated state;
   a haptic device, attached to the wearable structure, that provides feedback about a movement made by the user;
   a controller communicatively coupled to the actuator and to the haptic device to provide closed-loop control of the actuator; and
   a head mounted display system that comprises one or more processors configured to:
      present one or more computer-generated elements to the user as part of a virtual scene;
      generate a control signal based at least in part on the virtual scene and the feedback about the movement made by the user as provided by the haptic device; and
      communicate the control signal to the controller, whereby the control signal, when received by the controller, causes the actuator to transition from the unactuated state to the actuated state to provide a sensation that corresponds to the virtual scene.

2. The wearable device of claim 1, further comprising a tensioning mechanism harnessed to the wearable structure in a manner that is relative to the fit of the wearable structure about the body part of the user.

3. The wearable device of claim 2, further comprising a guide mechanism that directs substantially tangential movement of the tensioning mechanism relative to a surface of the body part.

4. The wearable device of claim 2, further comprising a drive unit mounted to the actuator and mechanically coupled to the tensioning mechanism to drive substantially tangential movement of the tensioning mechanism relative to a surface of the body part.

5. The wearable device of claim 4, wherein:
   the drive unit comprises a spool;
   the tensioning mechanism comprises a cable; and
   the actuator, when actuated, rotates the cable about the spool to provide substantially tangential movement of the tensioning mechanism relative to the surface of the body part.

6. The wearable device of claim 2, wherein each band element comprises a guide mechanism about which the tensioning mechanism harnesses to the wearable structure.

7. The wearable device of claim 6, wherein each guide mechanism positions the tensioning mechanism away from contact with a surface of the body part.

8. A method, comprising;
presenting, by a head mounted display donned by a user, one or more computer-generated elements to the user as part of a virtual scene;
providing, by a haptic device donned by the user, feedback about a movement made by the user to facilitate closed-loop control of an actuator that is coupled to a plurality of band elements that substantially surround a body part of the user, wherein one or more of the band elements comprise one or more vibrotactors configured to provide haptic feedback to the user;
generating, by the head mounted display donned by the user, a control signal configured to transition the actuator from an unactuated state to an actuated state based at least in part on the virtual scene and the feedback about the movement made by the user as provided by the haptic device;
receiving, by a controller communicatively coupled to the actuator, the control signal configured to transition the actuator from the unactuated state to the actuated state; and
causing, by the controller, the actuator to transition from the unactuated state to the actuated state, wherein the transition from the unactuated state to the actuated state comprises:
tightening the plurality of band elements around the body part of the user; and
providing a sensation that corresponds to the virtual scene.

9. The method of claim 8, further comprising coupling the band elements to a tensioning mechanism in a manner that causes substantially tangential movement of the tensioning mechanism relative to a surface of the body part when the actuator is transitioned from the unactuated state to the actuated state.

10. The method of claim 9, further comprising mounting a drive unit to the actuator and mechanically coupling the drive unit to the tensioning mechanism to drive the substantially tangential movement of the tensioning mechanism without backlash.

11. The method of claim 10, wherein:
the drive unit comprises a spool;
the tensioning mechanism comprises a cable; and
the method further comprises, configuring the actuator to rotate the cable about the spool to provide the substantially tangential movement of the tensioning mechanism.

12. The method of claim 9, further comprising:
configuring each band element with a guide mechanism about which the tensioning mechanism harnesses to a device that substantially surrounds the body part of the user.

13. The method of claim 12, further comprising:
configuring each guide mechanism within each band element in a manner that positions the tensioning mechanism away from contact with the surface of the body part.

14. An artificial reality system comprising:
a head-mounted display;
a wearable device dimensioned to fit about a body part of a user;
a plurality of band elements, attached to the wearable device, that are configured to substantially surround the body part of the user when the user dons the wearable device, wherein one or more of the band elements comprise one or more vibrotactors configured to provide haptic feedback to the user;
an actuator that is coupled to one or more of the plurality of band elements, the actuator being configured to tighten the plurality of band elements around the body part of the user when transitioned from an unactuated state to an actuated state;
a haptic device, attached to the wearable device, that provides feedback about a movement made by the user;
a controller communicatively coupled to the actuator and to the haptic device to provide closed-loop control of the actuator; and
one or more processors that are configured to:
present one or more computer-generated elements to the user as part of a virtual scene;
generate a control signal based at least in part on the virtual scene and the feedback about the movement made by the user as provided by the haptic device; and
communicate the control signal between the head-mounted display and the controller, whereby the control signal, when received by the controller, causes the actuator to transition from the unactuated state to the actuated state to provide a sensation that corresponds to the virtual scene.

15. The artificial reality system of claim 14, further comprising a tensioning mechanism coupled to the plurality of band elements in a manner that causes substantially tangential movement of the tensioning mechanism relative to a surface of the body part when the actuator is transitioned from the unactuated state to the actuated state.

* * * * *